US012712262B2

(12) United States Patent
Kinugawa et al.

(10) Patent No.: US 12,712,262 B2
(45) Date of Patent: Aug. 18, 2026

(54) ANTENNA MODULE AND COMMUNICATION APPARATUS INCLUDING THE SAME

(71) Applicant: Murata Manufacturing Co., Ltd., Nagaokakyo (JP)

(72) Inventors: Kota Kinugawa, Nagaokakyo (JP); Hideki Ueda, Nagaokakyo (JP); Takaya Nemoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 28 days.

(21) Appl. No.: 18/925,077

(22) Filed: Oct. 24, 2024

(65) Prior Publication Data

US 2025/0046995 A1 Feb. 6, 2025

Related U.S. Application Data

(63) Continuation of application No. PCT/JP2023/014087, filed on Apr. 5, 2023.

(30) Foreign Application Priority Data

Jul. 19, 2022 (JP) ................................ 2022-114997

(51) Int. Cl.
*H01Q 1/24* (2006.01)
*H01Q 3/36* (2006.01)
(Continued)

(52) U.S. Cl.
CPC ............ *H01Q 3/36* (2013.01); *H01Q 9/0407* (2013.01); *H01Q 21/24* (2013.01)

(58) Field of Classification Search
CPC .. H01Q 1/24; H01Q 3/36; H01Q 3/40; H01Q 9/0407; H01Q 13/08; H01Q 21/065;
(Continued)

(56) References Cited

U.S. PATENT DOCUMENTS 6,340,948 B1 * 1/2002 Munoz-Garcia ....... H01Q 21/22 342/373
2020/0395681 A1 * 12/2020 Ueda .................... H01Q 1/2283
(Continued)

FOREIGN PATENT DOCUMENTS

JP 2002-217803 A 8/2002
JP 2005-269090 A 9/2005
(Continued)

OTHER PUBLICATIONS

International Search Report and Written Opinion mailed on Jun. 20, 2023, received for PCT Application PCT/JP2023/014087, filed on Apr. 5, 2023, 8 pages including English Translation.

*Primary Examiner* — Thai Pham
(74) *Attorney, Agent, or Firm* — XSENSUS LLP

(57) ABSTRACT

An antenna module includes radiating elements including a first element and a second element and a radio frequency integrated circuit (RFIC) and exchanges signals with a baseband integrated circuit (BBIC). The RFIC includes a transmission circuit that supplies radio frequency signals to the radiating elements and a reception circuit that receives radio frequency signals from the radiating elements. The RFIC exchanges intermediate frequency signals with the BBIC. A first intermediate frequency signal is used for communication between the transmission circuit and the BBIC. A second intermediate frequency signal is used for communication between the reception circuit and the BBIC. When a variation in the reception level of a radio frequency signal received by the reception circuit during transmission of a radio frequency signal from the transmission circuit exceeds a predetermined value, the RFIC stops emission of radio waves from the first element.

20 Claims, 14 Drawing Sheets

(51) Int. Cl.
*H01Q 9/04* (2006.01)
*H01Q 21/24* (2006.01)
*H04B 1/38* (2015.01)

(58) Field of Classification Search
CPC .......... H01Q 21/24; H01Q 23/00; H04B 1/38; H04B 7/06
See application file for complete search history.

(56) References Cited

U.S. PATENT DOCUMENTS

| | | | | |
|---|---|---|---|---|
| 2023/0145095 | A1* | 5/2023 | Onaka | H04B 1/3827<br>455/73 |
| 2024/0186723 | A1* | 6/2024 | Yamada | H01Q 21/08 |
| 2025/0070462 | A1* | 2/2025 | Morimoto | H01Q 21/08 |

FOREIGN PATENT DOCUMENTS

| | | | |
|---|---|---|---|
| JP | 2010-130036 | A | 6/2010 |
| JP | 2011-151658 | A | 8/2011 |
| WO | 2020/170722 | A1 | 8/2020 |

* cited by examiner (A)

(B)

ANTENNA MODULE AND COMMUNICATION APPARATUS INCLUDING THE SAME

CROSS-REFERENCE TO RELATED APPLICATIONS

This is a continuation application of PCT/JP2023/014087, filed on Apr. 5, 2023, designating the United States of America, which is based on and claims priority to Japanese Patent Application No. JP 2022-114997 filed on Jul. 19, 2022. The entire contents of the above-identified applications, including the specifications, drawings and claims, are incorporated herein by reference in their entirety.

TECHNICAL FIELD

The present disclosure relates to an antenna module and a communication apparatus including the antenna module and, more particularly, relates to a technology for improving the radiation efficiency of an array antenna.

BACKGROUND ART

International Publication No. 2020/170722 (Patent Document 1) discloses an antenna module including a dielectric substrate with a planar shape folded into a substantially L-shape and radiating elements arranged on two surfaces of the dielectric substrate that have different normal directions. The antenna module disclosed in International Publication No. 2020/170722 (Patent Document 1) can emit radio waves in different directions from the radiating elements on the surfaces of the dielectric substrate.

CITATION LIST

Patent Document

Patent Document 1: International Publication No. 2020/170722

SUMMARY OF DISCLOSURE

Technical Problem

An antenna module as disclosed in International Publication No. 2020/170722 (Patent Document 1) may be used for a mobile terminal, such as a mobile phone, a smartphone, or a tablet. In the mobile terminal, the antenna module is disposed near an end portion inside of a housing.

Normally, the user holds the mobile terminal in one or both hands to operate the mobile terminal. Here, depending on how the user holds the mobile terminal in the hands, a radiating element in the antenna module may be covered by the hand of the user. In this case, even a radio frequency signal is supplied to the radiating element, the radiating element cannot properly emit a radio wave. This leads to the waste of radiation power and may decrease radiation performance.

The present disclosure is made to solve the above described problem, and an object of the present disclosure is to prevent a decrease in radiation efficiency even assuming an obstacle is present over a radiating element of an antenna module.

Solution to Problem

An antenna module according to the present disclosure includes first radiating elements including a first element and a second element and a radio frequency circuit, and exchanges signals with a baseband circuit. The radio frequency circuit includes a transmission circuit that supplies radio frequency signals to the first radiating elements and a reception circuit that receives radio frequency signals from the first radiating elements. The radio frequency circuit exchanges intermediate frequency signals with the baseband circuit. A first intermediate signal is used for communication between the transmission circuit and the baseband circuit. A second intermediate signal different from the first intermediate signal is used for communication between the reception circuit and the baseband circuit. Assuming a first condition is satisfied, the radio frequency circuit stops emission of radio waves from the first element, the first condition being satisfied assuming a variation in the reception level of a radio frequency signal received by the reception circuit during transmission of a radio frequency signal from the transmission circuit exceeds a predetermined value.

Advantageous Effects of Disclosure

In the antenna module according to the present disclosure, different intermediate frequency (IF) signals are used to cause the transmission circuit to transmit a radio frequency signal to the first element that in turn emits a radio wave and cause the reception circuit to receive the emitted radio wave. Assuming the reception level of a received signal based on the received radio wave exceeds the predetermined value, the emission of radio waves from the first element is stopped. This makes it possible to prevent power from being supplied to an element that cannot properly emit radio waves due to an obstacle and thereby makes it possible to reduce unnecessary power consumption. This in turn makes it possible to prevent a decrease in radiation efficiency.

DESCRIPTION OF EMBODIMENTS

Figure 1:
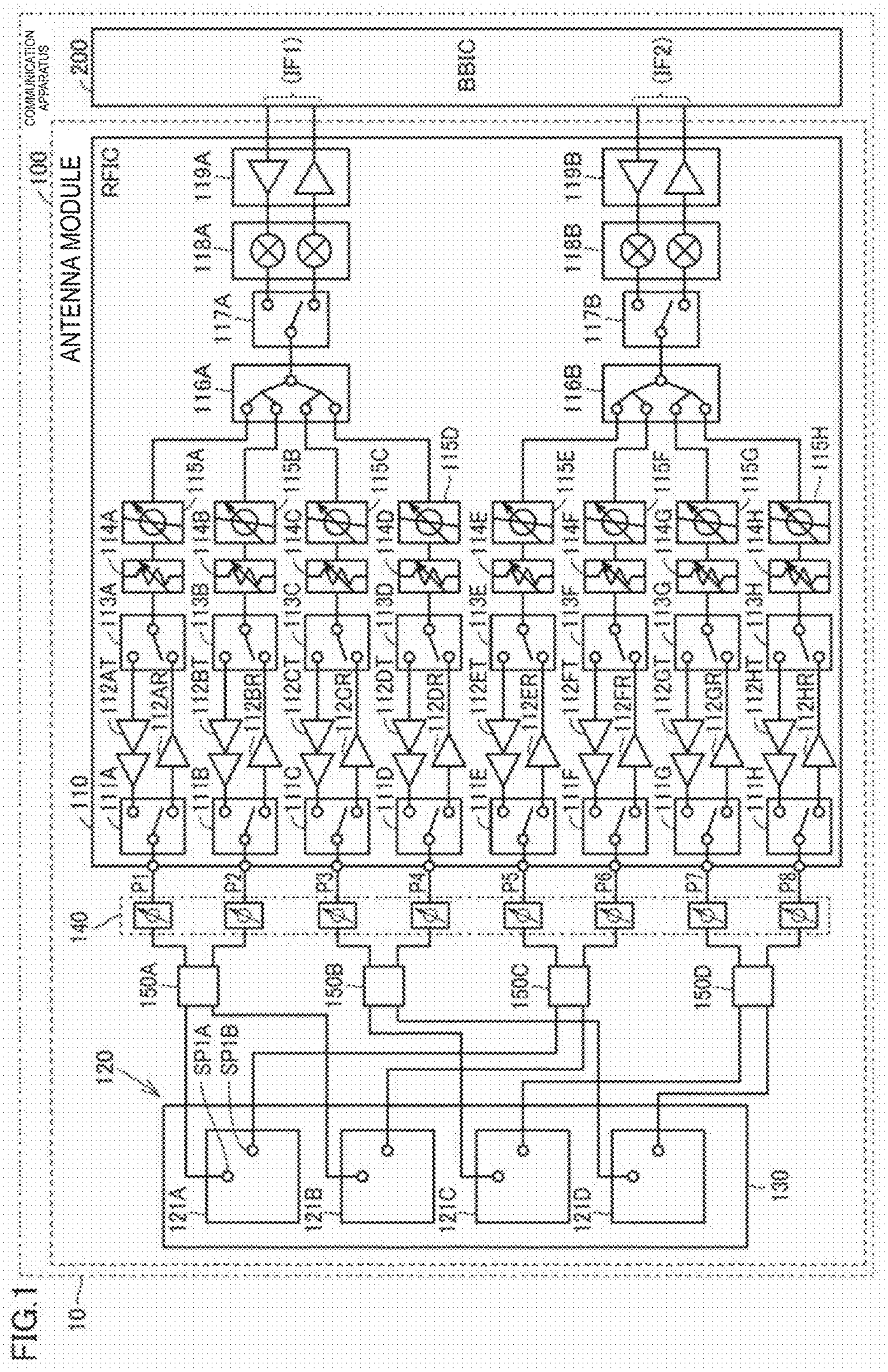
FIG. 1 is a block diagram illustrating a communication apparatus including an antenna module according to a first embodiment.

Embodiments of the present disclosure are described in detail below with reference to the drawings. The same reference number is assigned to the same or similar components in the drawings, and the descriptions of those components are not repeated.

First Embodiment (Basic Configuration of Communication Apparatus)

FIG. 1 is a block diagram of a communication apparatus 10 including an antenna module 100 according to a first embodiment. The communication apparatus 10 is, for example, a mobile terminal, such as a mobile phone, a smartphone, or a tablet, or a personal computer having a communication function. Examples of frequency bands of radio waves used for the antenna module 100 according to the present embodiment include millimeter bands with center frequencies of 28 GHZ, 39 GHZ, and 60 GHz. However, radio waves in frequency bands other than these frequency bands may also be used.

Referring to FIG. 1, the communication apparatus 10 includes an antenna module 100 and a baseband integrated circuit (BBIC) 200 that implements a baseband signal processing circuit. The antenna module 100 includes a radio frequency integrated circuit (RFIC) 110, which is an example of a radio frequency circuit, an antenna device 120, a phase shifter 140, and hybrid couplers 150A to 150D. In the descriptions below, the hybrid couplers 150A to 150D may be collectively referred to as "hybrid couplers 150".

The communication apparatus 10 up-converts a signal transmitted from the BBIC 200 to the antenna module 100 into a radio frequency signal and emits the radio frequency signal from the antenna device 120. Also, the communication apparatus 10 down-converts a radio frequency signal received by the antenna device 120 and processes the down-converted signal with the BBIC 200.

The antenna device 120 includes a dielectric substrate 130 and radiating elements 121A to 121D arranged on or in the dielectric substrate 130. FIG. 1 illustrates an example in which four radiating elements 121A to 121D are arranged on or in the dielectric substrate 130. However, the number of radiating elements arranged on or in the dielectric substrate 130 is not limited to four. Also, FIG. 1 illustrates an example in which the radiating elements 121A to 121D are arranged in a one-dimensional array on or in the dielectric substrate 130. However, radiating elements may be arranged in a two-dimensional array on or in the dielectric substrate 130.

In the descriptions below, the radiating elements 121A to 121D may be collectively referred to as "radiating elements 121". In the first embodiment, each radiating element 121 is a planar microstrip antenna with a substantially square shape. Alternatively, each radiating element 121 may have a circular, elliptical, or a polygonal shape other than a square shape.

The radiating element 121 is a so-called dual polarization antenna module that can emit radio waves with two different polarization directions. The radiating element 121 includes a feeding point SP1A for emitting a radio wave with a first polarization direction and a feeding point SP1B for emitting a radio wave with a second polarization direction. In the first embodiment, the two polarization directions are orthogonal to each other.

The RFIC 110 includes switches 111A to 111H, 113A to 113H, 117A, and 117B, power amplifiers 112AT to 112HT, low noise amplifiers 112AR to 112HR, attenuators 114A to 114H, phase shifters 115A to 115H, signal combiner/splitters 116A and 116B, mixers 118A and 118B, and amplifier circuits 119A and 119B. Among these components, the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal combiner/splitter 116A, the mixer 118A, and the amplifier circuit 119A constitute a radio frequency signal circuit for emitting radio waves with the first polarization direction. A first intermediate frequency signal IF1 is supplied from the BBIC 200 to this circuit.

Also, the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal combiner/splitter 116B, the mixer 118B, and the amplifier circuit 119B constitute a radio frequency signal circuit for emitting radio waves with the second polarization direction. A second intermediate frequency signal IF2 different from the first intermediate frequency signal IF1 is supplied from the BBIC 200 to this circuit.

Assuming transmitting radio frequency signals, the switches 111A to 111H and 113A to 113H are switched to the power amplifiers 112AT to 112HT, and the switches 117A and 117B are connected to transmission amplifiers of the amplifier circuits 119A and 119B. Assuming receiving radio frequency signals, the switches 111A to 111H and 113A to 113H are switched to the low noise amplifiers 112AR to 112HR, and the switches 117A and 117B are connected to reception amplifiers of the amplifier circuits 119A and 119B. In the RFIC 110 of the antenna module 100 of the first embodiment, because different intermediate frequency signals are used for the circuit for the first polarization and the circuit for the second polarization, the circuit for the first polarization may be used as a transmission circuit, and the circuit for the second polarization may be used as a reception circuit.

Signals transmitted from the BBIC 200 are amplified by the amplifier circuits 119A and 119B and up-converted by the mixers 118A and 118B. Each transmission signal, which is an up-converted radio frequency signal, is split into four signals by the corresponding one of the signal combiner/splitters 116A and 116B. Each of the signal combiner/splitters 116A and 116B may also be a switch circuit that can connect one input terminal to any one of four output terminals. The directivity of radio waves output from the radiating elements on or in the substrate can be adjusted by individually adjusting the degrees of phase shift of the phase shifters 115A to 115H disposed in the corresponding signal paths. Also, the attenuators 114A to 114H adjust the strengths of transmission signals.

Output ports P1 to P8, which are connected respectively to the switches 111A to 111H, are connected to the corresponding hybrid couplers 150 via the phase shifter 140. The output terminals of the hybrid couplers 150 are connected to the corresponding feeding points of the radiating elements 121.

More specifically, signals from the output ports P1 and P2 are input to the two input terminals of the hybrid coupler 150A. One of the output terminals of the hybrid coupler 150A is connected to the feeding point SP1A of the radiating element 121A. The other one of the output terminals of the hybrid coupler 150A is connected to the feeding point SP1A of the radiating element 121B. Signals from the output ports P3 and P4 are input to the two input terminals of the hybrid coupler 150B. One of the output terminals of the hybrid coupler 150B is connected to the feeding point SP1A of the radiating element 121C. The other one of the output terminals of the hybrid coupler 150B is connected to the feeding point SP1A of the radiating element 121D.

Signals from the output ports P5 and P6 are input to the two input terminals of the hybrid coupler 150C. One of the output terminals of the hybrid coupler 150C is connected to the feeding point SP1B of the radiating element 121A. The other one of the output terminals of the hybrid coupler 150C is connected to the feeding point SP1B of the radiating element 121B. Signals from the output ports P7 and P8 are input to the two input terminals of the hybrid coupler 150D. One of the output terminals of the hybrid coupler 150D is connected to the feeding point SP1B of the radiating element 121C. The other one of the output terminals of the hybrid coupler 150D is connected to the feeding point SP1B of the radiating element 121D.

The phase shifter 140 is configured to individually change the phases of signals input from the output ports to each hybrid coupler 150. As described later with reference to FIG. 2, it is possible to adjust the power of two output signals by adjusting the phase difference between the two input signals of the hybrid coupler 150. The phase shifter 140 is not an essential component, and the phases of signals input to the hybrid couplers 150 may be adjusted by the phase shifters 115A to 115H disposed in the corresponding signal paths. Also, beam directions may be adjusted by the phase shifter 140 without providing the phase shifters 115A to 115H.

Received signals, which are radio frequency signals received by the radiating elements 121, are transmitted to the RFIC 110, pass through four different signal paths, and are combined by the corresponding one of the signal combiner/splitters 116A and 116B. The combined received signal is down-converted by one of the mixers 118A and 118B, amplified by one of the amplifier circuits 119A and 119B, and transmitted to the BBIC 200.

For example, the RFIC 110 is formed as a one-chip integrated circuit component having the circuit configuration described above. Alternatively, devices (switches, a power amplifier, a low noise amplifier, an attenuator, and a phase shifter) of the RFIC 110 for each of the radiating elements 121A and 121B may be formed as a one-chip integrated circuit component.

Also, in FIG. 1, the phase shifter 140 and the hybrid couplers 150 are provided separately from the RFIC 110 and the antenna device 120. However, the phase shifter 140 and the hybrid couplers 150 may be provided in the RFIC 110 or the antenna device 120.

(Descriptions of Hybrid Couplers)

Figure 2:
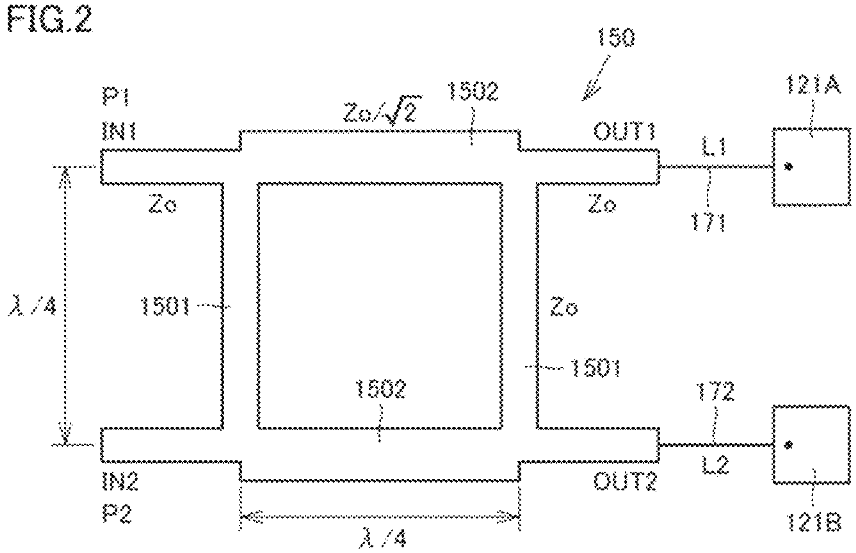
FIG. 2 is a diagram illustrating a hybrid coupler.

Next, the hybrid couplers 150 are described with reference to FIG. 2. In FIG. 2, the hybrid coupler 150A is used as an example.

Each hybrid coupler 150 is formed by combining two input terminals IN1 and IN2, two output terminals OUT1 and OUT2, two first lines 1501 with characteristic impedance Zo, and two second lines 1502 with impedance Zo/√2. In the case of the hybrid coupler 150A, the output ports P1 and P2 are connected to the input terminals IN1 and IN2, respectively.

More specifically, one of the second lines 1502 is connected between the input terminal IN1 (a first input terminal) and the output terminal OUT1 (a first output terminal), and the other one of the second lines 1502 is connected between the input terminal IN2 (a second input terminal) and the output terminal OUT2 (a second output terminal). Also, the input terminal IN1 and the input terminal IN2 are connected to each other by one of the first lines 1501, and the output terminal OUT1 and the output terminal OUT2 are connected to each other by the other one of the first lines 1501. The lengths of both of the first lines 1501 and the second lines 1502 are set to λ/4, in which λ indicates the wavelength in the dielectric substrate 130 of radio frequency signals supplied to the radiating elements.

The corresponding radiating elements 121 are connected to the output terminals OUT1 and OUT2 via feeding wires 171 and 172. In the case of the hybrid coupler 150A, the radiating element 121A is connected to the output terminal OUT1, and the radiating element 121B is connected to the output terminal OUT2.

A wire length L1 of the feeding wire 171 and a wire length L2 of the feeding wire 172 are set such that the difference between the wire lengths L1 and L2 is nλ (n is an integer greater than or equal to zero). With this configuration, assuming radio frequency signals with the same phase are output from the output terminals OUT1 and OUT2, radio waves with the same phase are emitted from the radiating elements 121A and 121B.

In the hybrid coupler 150, assuming a radio frequency signal with a phase difference of +90° with respect to the input terminal IN1 is supplied to the input terminal IN2, a radio frequency signal with twofold power is output from the output terminal OUT1, but no radio frequency signal is output from the output terminal OUT2. On the contrary, assuming a radio frequency signal with a phase difference of −90° with respect to the input terminal IN1 is supplied to the input terminal IN2, a radio frequency signal with twofold power is output from the output terminal OUT2, but no radio frequency signal is output from the output terminal OUT1.

By adjusting the phase difference θ of a radio frequency signal supplied to the input terminal IN2 with respect to a radio frequency signal supplied to the input terminal IN1 within a range of $-90° < \theta < 90°$, power proportional to the phase difference is output from the output terminals OUT1 and OUT2. For example, assuming the phase difference θ is adjusted to 0°, radio frequency signals with the same power are output from the output terminals OUT1 and OUT2. That is, the hybrid coupler 150 functions as a combiner and a splitter.

In the descriptions related to FIG. 2, based on an assumption that radio waves are emitted or transmitted from the radiating elements 121, terminals connected to the RFIC 110 are referred to as "input terminals", and terminals connected to the radiating elements 121 are referred to as "output terminals". However, assuming radio waves are received by the radiating elements 121, terminals connected to the radiating elements 121 are referred to as "output terminals", and terminals connected to the RFIC 110 are referred to as "input terminals". Similarly, in the descriptions of hybrid couplers and a Butler matrix circuit below, terminals closer to the radiating elements 121 are referred to as "output terminals" and terminals connected to the RFIC 110 are referred to as "input terminals" merely for the purpose of convenience, and these terms do not limit the actual input and output directions of signals.

(Obstacle Detection Process)

Figure 3:
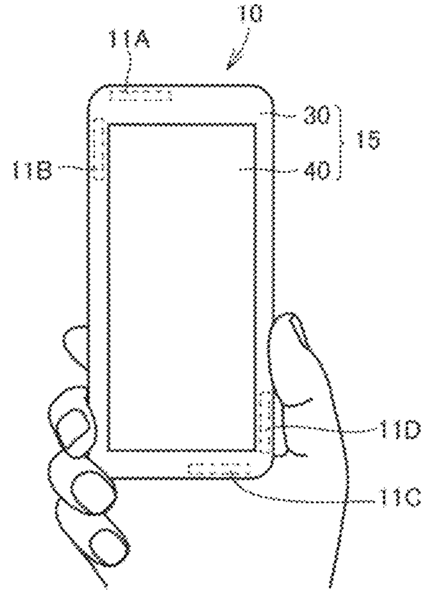
FIG. 3 is a diagram illustrating an example of the layout of an antenna module in a mobile terminal.
Figure 3:
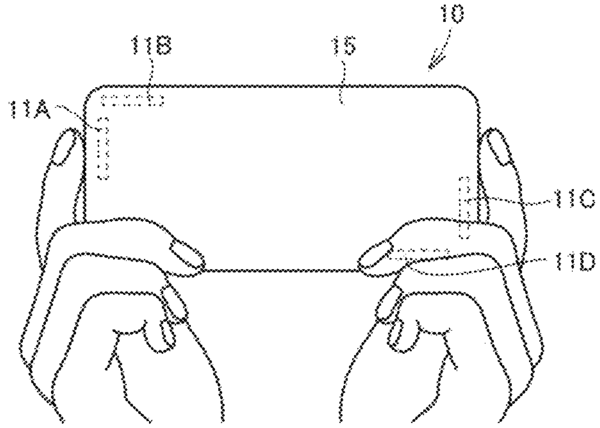

FIG. 3 illustrates states in which the user holds the communication apparatus 10. In the example of FIG. 3, the communication apparatus 10 is a smartphone, and a housing 15 includes a case 30 and a display screen 40. Assuming the user holds the smartphone with one hand, as illustrated in FIG. 3 (A), the communication apparatus 10 is held such that the rectangular display screen 40, which constitutes a part of the housing 15, is oriented vertically. In this case, a part from the middle to the lower end of the housing 15 in the long-side direction is covered by the hand of the user.

Assuming, for example, the user watches a video on the smartphone, as illustrated in FIG. 3 (B), the communication apparatus 10 is held such that the display screen 40 is oriented horizontally. In this case, the middle part and the lower corners of the housing 15 in the short-side direction tend to be covered by the hands of the user.

In communication apparatuses with planar shapes, such as smartphones and tablets, a configuration including multiple antennas is increasingly adopted to improve communication quality. On the other hand, there is also a growing need for thinner communication apparatuses with larger screens, and the proportion of a display screen in a housing is gradually increasing. The display screen of a communication apparatus is generally implemented by a liquid crystal panel or an organic EL panel. Such a display screen includes conductor wires that are arranged in a grid pattern on the surface or inside of the display screen and used to detect a position on the display screen touched by the user. Accordingly, the display screen functions as a shield for antennas that emit radio waves.

Therefore, in such a communication terminal, antennas are typically disposed at the end portions of the communication apparatus or the corners of the housing as indicated by positions 11A to 11D in FIG. 3. However, as illustrated in FIG. 3, depending on the manner in which the user holds the communication apparatus, the hands of the user may overlap the positions where antennas are typically located, and the antennas may become unable to properly emit radio waves.

For the above reason, in the first embodiment, an "obstacle detection process" is performed to detect whether an obstacle is present over each radiating element, and an "antenna selection process" is performed to stop the emission of radio waves from each radiating element over which an obstacle is present and thereby reduce unnecessary power consumption.

Figure 4:
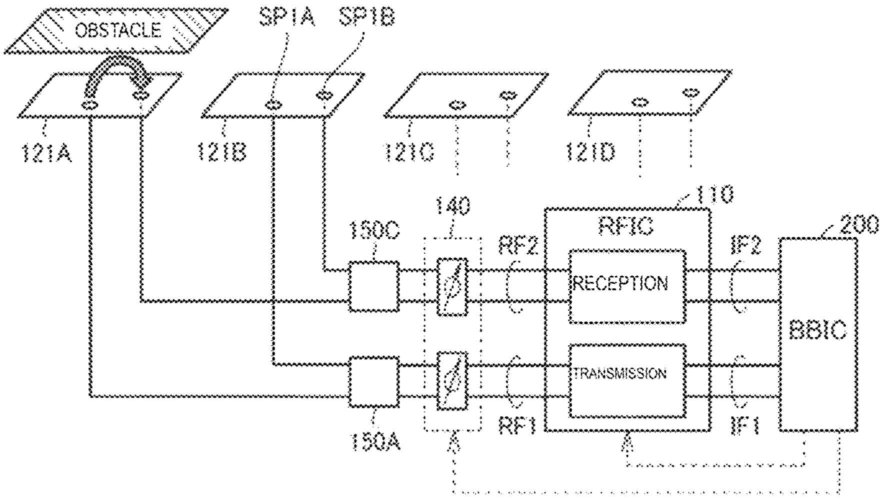
FIG. 4 is a diagram for describing an obstacle detection method according to the first embodiment.

FIG. 4 is a diagram for describing an obstacle detection method according to the first embodiment. In the first embodiment, to determine whether an obstacle is present over each radiating element 121, a radio frequency signal is transmitted to a feeding point of the radiating element 121 corresponding to one of the polarization directions to emit a radio wave, a reflected wave of the emitted radio wave is received by a path for the other one of the polarization directions, and the reception level of the received signal is measured.

In the example of FIG. 4, the radiating elements 121A and 121B are used for ease of description. However, the description also applies to the radiating elements 121C and 121D.

In FIG. 4, the BBIC 200 controls the switches 111A to 111H and 113A to 113H to set a circuit of the RFIC 110 using the first intermediate frequency signal IF1 as a transmission circuit and to set a circuit of the RFIC 110 using the second intermediate frequency signal IF2 as a reception circuit. The first intermediate frequency signal IF1 is up-converted into a radio frequency signal RF1 by the transmission circuit, and the radio frequency signal RF1 is input to the hybrid coupler 150A via the phase shifter 140. Here, for example, the radio frequency signal is supplied to the feeding point SP1A of the radiating element 121A by adjusting the phase shifter 140.

The feeding point SP1B of the radiating element 121A is connected to the reception circuit of the RFIC 110 via the hybrid coupler 150C and the phase shifter 140. With this configuration, a radio frequency signal RF2 received by the radiating element 121A is down-converted by the RFIC 110 into the second intermediate frequency signal IF2, and the second intermediate frequency signal IF2 is output to the BBIC 200.

The BBIC 220 detects a variation in the reception level (RSSI: received signal strength indicator) of the signal received by the radiating element 121A. Assuming no obstacle is present over the radiating element 121A, the reception level of the received signal is low because the emitted radio wave is not reflected. On the other hand, assuming an obstacle is present over the radiating element 121A, the reception level of the received signal is relatively high because the emitted radio wave is reflected by the obstacle. Accordingly, assuming a condition (first condition), in which the variation in RSSI exceeds a predetermined value, is satisfied, the BBIC 200 can determine that an obstacle is present over the radiating element 121A.

By sequentially performing such measurements for the radiating elements 121A to 121D, it is possible to determine whether an obstacle is present over each of the radiating elements 121. Assuming the presence of an obstacle over a certain radiating element 121 is detected, the BBIC 200 adjusts the phase shifter 140 in a radio wave emission process after the measurement to supply no radio frequency signal to the radiating element 121 over which the obstacle is present. This makes it possible to reduce the power consumption of the radiating element 121 over which the obstacle is present.

Also, assuming the power amplifiers in the RFIC 110 have excess amplification capability, the power supplied to radiating elements 121 over which no obstacle is present can be increased by adjusting the gains of the power amplifiers, so that the total strength of radio waves emitted from the antenna device 120 is not reduced. This in turn makes it possible to efficiently use the power supplied from the BBIC 200, thereby preventing a decrease in radiation efficiency of the antenna device 120.

Figure 5:
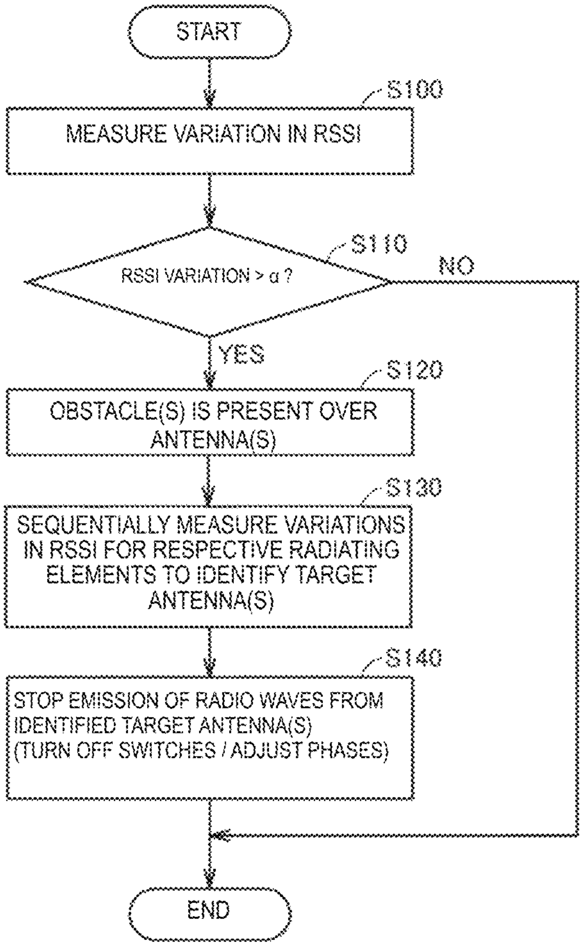
FIG. 5 is a flowchart illustrating a obstacle detection process and an antenna selection process according to the first embodiment.

FIG. 5 is a flowchart illustrating an obstacle detection process and an antenna selection process according to the first embodiment. In the first embodiment, it is assumed that the process of the flowchart of FIG. 5 is performed by the BBIC 200. However, the process may instead be performed by a control unit other than the BBIC 200.

Referring to FIG. 5, at step 100 (hereafter "step" is abbreviated to "S"), the BBIC 200 measures a variation in RSSI during a normal reception process. Next, at S110, the BBIC 200 determines whether the variation in RSSI is greater than a predetermined value α, i.e., whether a first condition is satisfied.

Assuming the variation in RSSI is less than or equal to the predetermined value α (NO at S110), the BBIC 200 determines that no obstacle is present over the radiating elements 121, skips the subsequent steps to end the process, and continues the normal transmission and reception processes.

Assuming the variation in RSSI is greater than the predetermined value α (YES at S110), the process proceeds to S120, and the BBIC 200 determines that one or more obstacles are present over one or more of the radiating elements 121 of the antenna device 120.

Then, at S130, as described with reference to FIG. 4, the BBIC 200 sequentially measures variations in RSSI for the respective radiating elements 121 to identify one or more radiating elements 121 over which one or more obstacles are present. Then, the BBIC 200 turns off switches in the RFIC 110 and/or adjusts the phase shift of the phase shifter 140 so that no radio frequency signal is transmitted to the identified one or more radiating elements 121 and thereby stops emission of radio waves from the identified one or more radiating elements 121 during the transmission process. Also, although not illustrated in FIG. 5, the power of radio frequency signals transmitted to radiating elements 121 over which no obstacle is present may be increased.

The stopping of the transmission of radio frequency signals to the identified one or more radiating elements 121 is reset after a predetermined period of time or at the next reception process. This makes it possible to emit radio waves using all radiating elements 121 assuming the one or more obstacles are removed.

In an array antenna module, performing control according to the above process makes it possible to reduce unnecessary power consumption resulting from an obstacle and prevent a decrease in radiation efficiency.

"Radiating elements 121" in the first embodiment correspond to "first radiating elements" in the present disclosure. "Radiating element 121A" and "radiating element 121B" in the first embodiment correspond, respectively, to "first element" and "second element" in the present disclosure. "RFIC 110" in the first embodiment corresponds to "radio frequency circuit" in the present disclosure. "BBIC 200" in the first embodiment corresponds to "baseband circuit" in the present disclosure. "First intermediate frequency signal IF1" and "second intermediate frequency signal IF2" in the first embodiment correspond, respectively, to "first intermediate signal" and "second intermediate signal" in the present disclosure. "Feeding point SP1A" and "feeding point SP1B" in the first embodiment correspond, respectively, to "first feeding point" and "second feeding point" in the present disclosure. "Hybrid coupler 150A" and "hybrid coupler 150C" in the first embodiment correspond, respectively, to "first hybrid coupler" and "second hybrid coupler" in the present disclosure.

Second Embodiment

In the configuration described in the first embodiment, a radio wave is emitted from a circuit connected to one of different feeding points of the same radiating element, a reflected wave of the radio wave is received by another circuit connected to the other one of the feeding points, and whether an obstacle is present over the radiating element is determined based on the RSSI of the reflected wave.

In a configuration described in a second embodiment, whether an obstacle is present is determined based on RSSI measured by emitting and receiving a radio wave between different radiating elements of an array antenna.

Figure 6:
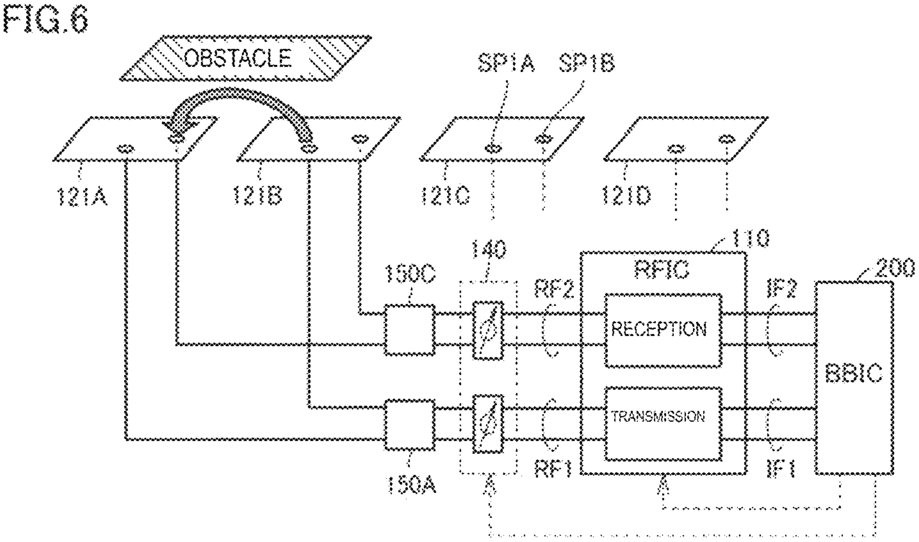
FIG. 6 is a diagram for describing an obstacle detection method according to a second embodiment.

FIG. 6 is a diagram for describing an obstacle detection method according to the second embodiment. Because the apparatus configuration of FIG. 6 is substantially the same as the apparatus configuration of FIG. 4 in the first embodiment, descriptions of details of the apparatus configuration are not repeated.

In the second embodiment, as illustrated in FIG. 6, a reflected wave of a radio wave emitted from the feeding point SP1A of the radiating element 121B is received by a reception circuit connected to the feeding point SP1B of the radiating element 121A. Assuming the variation in RSSI is greater than a predetermined value and the first condition is satisfied, it is determined that an obstacle is present in an area extending from the radiating element 121A to the radiating element 121B. Assuming it is determined that an obstacle is present, emission of radio waves from the radiating elements 121A and 121B is stopped.

Alternatively, a radio wave may be emitted from the radiating element 121A, and a reflected wave may be received by the radiating element 121B for the determination. Also, two radiating elements are not necessarily adjacent to each other. For example, another radiating element may be present between two radiating elements, as in the case of the radiating elements 121A and 121C.

Even with the above configuration, it is possible to stop emission of radio waves from radiating elements over which an obstacle is present and thereby prevent power consumption of radiating elements that cannot properly emit radio waves.

Also, in the second embodiment, it is possible to prevent a decrease in radiation efficiency by allocating power, which is normally supplied to radiating elements that have stopped emitting radio waves due to an obstacle, to other radiating elements.

Third Embodiment

In a third embodiment, a case of a dual-band antenna module, which includes stacked radiating elements capable of emitting radio waves in two different frequency bands, is described.

Figure 7:
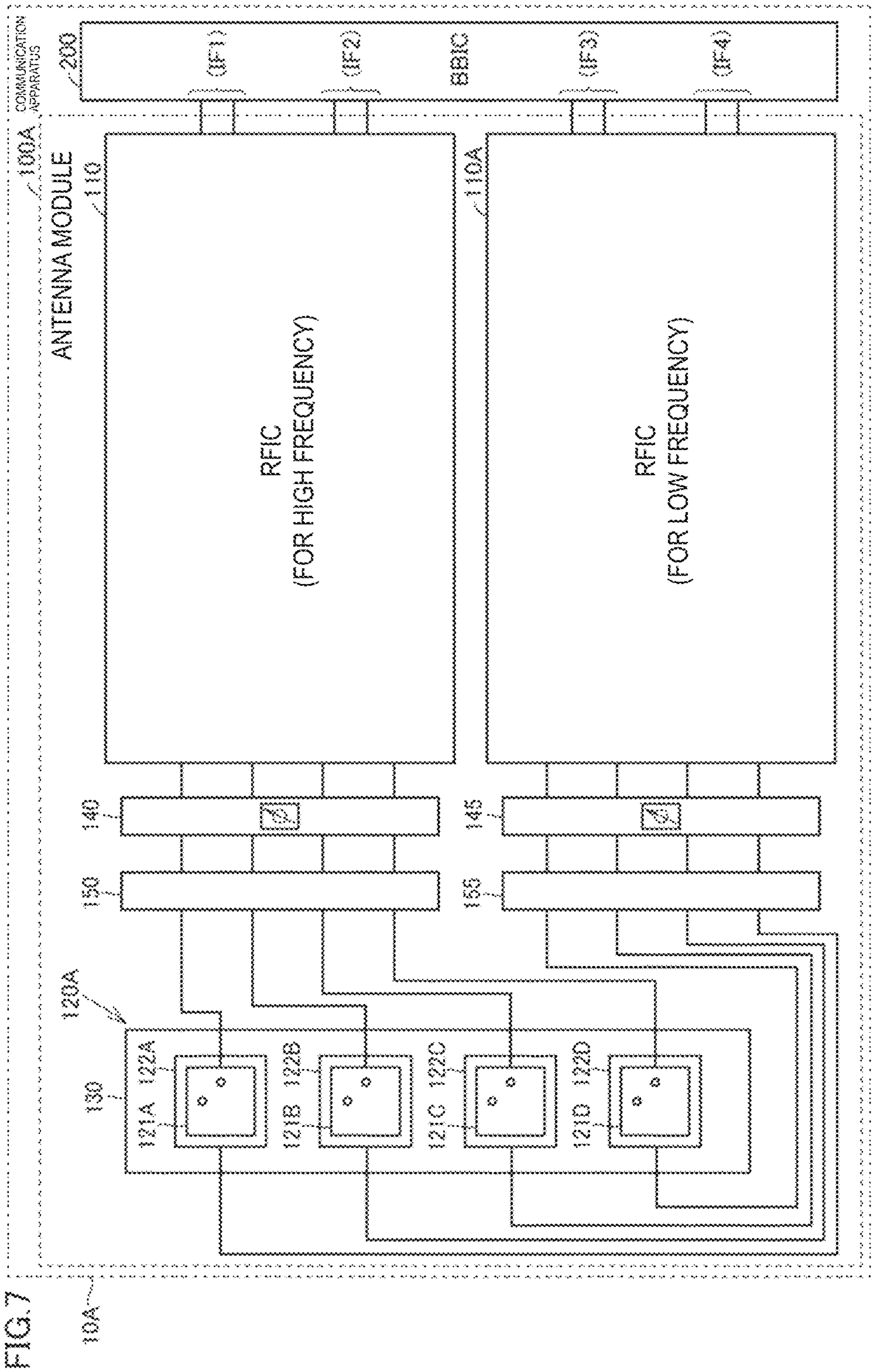
FIG. 7 is a block diagram illustrating a communication apparatus including an antenna module according to a third embodiment.

FIG. 7 is a block diagram of a communication apparatus 10A including an antenna module 100A according to the third embodiment. The antenna module 100A includes, in addition to the components of the antenna module 100, an RFIC 110A, a phase shifter 145, and hybrid couplers 155. Also, the antenna module 100A includes an antenna device 120A instead of the antenna device 120. The antenna device 120A includes, in addition to the components of the antenna device 120 of the first embodiment, radiating elements 122A to 122D. In the descriptions below, the radiating elements 122A to 122D may be collectively referred to as "radiating elements 122". Here, descriptions of components in FIG. 7 corresponding to the components of the antenna module 100 are not repeated.

In the antenna device 120A, the radiating elements 122A to 122D are paired with the corresponding radiating elements 121A to 121D. The size of each radiating element 122 is greater than the size of the radiating element 121. Therefore, the radiating element 122 emits radio waves in a lower frequency band than the radiating element 121. In plan view of the dielectric substrate 130 from the normal direction, each radiating element 122 is disposed to overlap the corresponding radiating element 121. In the dielectric substrate 130, the radiating element 121 is disposed apart from the radiating element 122 in a radio wave emission direction. That is, the antenna module 100A is a stacked dual-band antenna module.

In the antenna module 100A, the RFIC 110, the phase shifter 140, and the hybrid couplers 150 are devices for the radiating elements 121 on the low frequency side, and the RFIC 110A, the phase shifter 145, and the hybrid couplers 155 are devices for the radiating elements 122 on the high frequency side.

The RFIC 110A, the phase shifter 145, and the hybrid couplers 155 have substantially the same configurations as those of the RFIC 110, the phase shifter 140, and the hybrid couplers 150, and therefore detailed descriptions of these components are omitted. The RFIC 110 converts the intermediate frequency signals IF1 and IF2 from the BBIC 200 into radio frequency signals and supplies the radio frequency signals to the feeding points of the radiating elements 121. The RFIC 110A converts intermediate frequency signals IF3 and IF4 from the BBIC 200 into radio frequency signals and supplies the radio frequency signals to the feeding points of the radiating elements 122.

In FIG. 7, due to the limitation of paper space, it appears that one feeding wire extending from each of the hybrid couplers 150 and 155 is connected to each radiating element. However, in an actual configuration, two feeding wires are connected to the feeding points of each radiating element.

In such a stacked antenna module, because the radiating element 121 is disposed in the radio wave emission direction from the radiating element 122 disposed in a lower part of the dielectric substrate 130, it is difficult to detect an obstacle by using the radiating element 122 compared to the radiating element 121. Therefore, in a stacked antenna module, radiating elements on the higher frequency side are used to detect obstacles. That is, in the antenna module 100A, the radiating elements 121 are used to detect obstacles.

Figure 8:
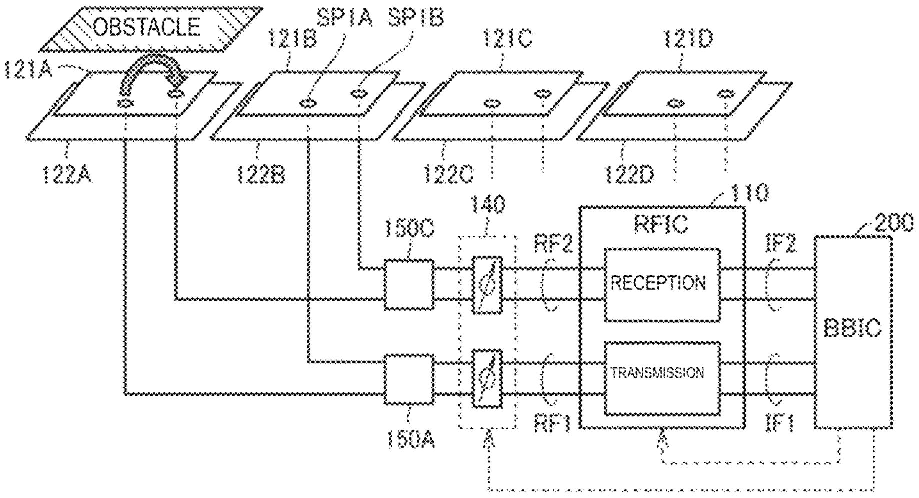
FIG. 8 is a diagram for describing an obstacle detection method according to the third embodiment.

FIG. 8 is a diagram for describing an obstacle detection method according to the third embodiment. In FIG. 8, the radiating elements 122A to 122D on the low frequency side are added to the components illustrated in FIG. 4 of the first embodiment. In FIG. 8, the transmission circuit and the reception circuit for the radiating elements 122 are omitted.

Referring to FIG. 8, also in the antenna module 100A, a circuit connected to the feeding points SP1A of the radiating elements 121 is set as a transmission circuit, and a circuit connected to the feeding points SP1B is set as a reception circuit. A radio frequency signal is supplied to the feeding point SP1A of each radiating element 121 to emit a radio wave, and a reflected wave of the radio wave is received by the reception circuit connected to the feeding point SP1B. Then, assuming RSSI of the received signal is greater than the predetermined value and the first condition is satisfied, the BBIC 200 determines that an obstacle is present over the radiating element. The BBIC 200 stops emission of radio waves from the radiating element over which an obstacle is detected by controlling switches in the RFIC and/or the phase shifters 140 and 145.

With this configuration, even in a stacked dual-band antenna module, it is possible to suppress power consumption of a radiating element over which an obstacle is present. Furthermore, it is possible to prevent a decrease in radiation efficiency of the antenna device by increasing power supplied to radiating elements over which no obstacle is present.

Also in the antenna module 100A, similarly to the second embodiment, an obstacle may be detected by transmitting and receiving a radio wave between different radiating elements.

"Radiating elements 122" in the third embodiment correspond to "second radiating elements" in the present disclosure. "Radiating element 122A" in the third embodiment corresponds to "third element" in the present disclosure.

<Power Distribution Using Butler Matrix Circuit>

Next, an example of settings for power distribution using a Butler matrix circuit is described with reference to FIGS. 9 to 22. FIGS. 9 to 22 are based on an assumption that one or more obstacles are detected over one or more radiating elements in the first through third embodiments and are used to describe settings of input power for emitting radio waves with uniform power from the remaining radiating elements and settings of the phase shifter 140.

FIGS. 9 to 12 show examples of settings for emitting a radio wave from one of four radiating elements. FIGS. 13 to 18 show examples of settings for emitting radio waves from two of the four radiating elements. FIGS. 19 to 22 show examples of settings for emitting radio waves from three of the four radiating elements.

First, a configuration of a Butler matrix circuit 152 is described with reference to FIG. 9. The Butler matrix circuit 152 may be provided instead of the hybrid couplers 150 in the first embodiment. More specifically, one Butler matrix circuit is provided in place of the hybrid couplers 150A and 150B for the feeding points SP1A of the radiating elements 121, and one Butler matrix circuit is provided in place of the hybrid couplers 150C and 150D for the feeding points SP1B. In the descriptions below, it is assumed that the Butler matrix circuit 152 is for supplying radio frequency signals to the feeding points SP1A.

The Butler matrix circuit 152 includes four hybrid couplers 152A to 152D and two delay circuits 160A and 160B. In outline, the Butler matrix circuit 152 has a configuration in which the hybrid couplers 152A and 152B are connected to the hybrid couplers 152C and 152D in cascade arrangement via the delay circuits 160A and 160B.

One of the input terminals (first input terminal) of the hybrid coupler 152A is connected to the output port P1 of the RFIC 110 via a phase shifter 140A. The other one of the input terminals (second input terminal) of the hybrid coupler 152A is connected to the output port P2 of the RFIC 110 via a phase shifter 140B. Similarly, one of the input terminals (first input terminal) of the hybrid coupler 152B is connected to the output port P3 of the RFIC 110 via a phase shifter 140C. The other one of the input terminals (second input terminal) of the hybrid coupler 152B is connected to the output port P4 of the RFIC 110 via a phase shifter 140D.

One of the output terminals (first output terminal) of the hybrid coupler 152A is connected to one of the input terminals (first input terminal) of the hybrid coupler 152C via the delay circuit 160A. The other one of the output terminals (second output terminal) of the hybrid coupler 152A is connected to one of the input terminals (first input terminal) of the hybrid coupler 152D. One of the output terminals (first output terminal) of the hybrid coupler 152B is connected to the other one of the input terminals (second input terminal) of the hybrid coupler 152C. The other one of the output terminals (second output terminal) of the hybrid coupler 152B is connected to the other one of the input terminals (second input terminal) of the hybrid coupler 152D via the delay circuit 160B. Each of the delay circuits 160A and 160B delays the phase of an input signal by −45°.

One of the output terminals (first output terminal) of the hybrid coupler 152C is connected to the feeding point SP1A of the radiating element 121A, and the other one of the output terminals (second output terminal) of the hybrid coupler 152C is connected to the feeding point SP1A of the radiating element 121B. One of the output terminals (first output terminal) of the hybrid coupler 152D is connected to the feeding point SP1A of the radiating element 121C, and the other one of the output terminals (second output terminal) of the hybrid coupler 152D is connected to the feeding point SP1A of the radiating element 121D.

The above configuration makes it possible to adjust the power and phases of signals input to the input terminals of the Butler matrix circuit 152 and thereby makes it possible to distribute power to the four radiating elements 121A to 121D.

"Radiating element 121C" and "radiating element 121D" correspond, respectively, to "third element" and "fourth element" in the present disclosure. "Hybrid couplers 152A to 152D" correspond, respectively, to "third to sixth hybrid couplers" in the present disclosure. "Delay circuit 160A" and "delay circuit 160B" correspond, respectively, to "first delay circuit" and "second delay circuit" in the present disclosure.

(a: One Element Output)

Settings for emitting a radio wave from one of the radiating elements 121A to 121D are described with reference to FIGS. 9 to 12. In the descriptions below, it is assumed that the maximum power that can be supplied from the RFIC to each input terminal is 1.0.

(a-1: Output from Radiating Element 121A)

Figure 9:
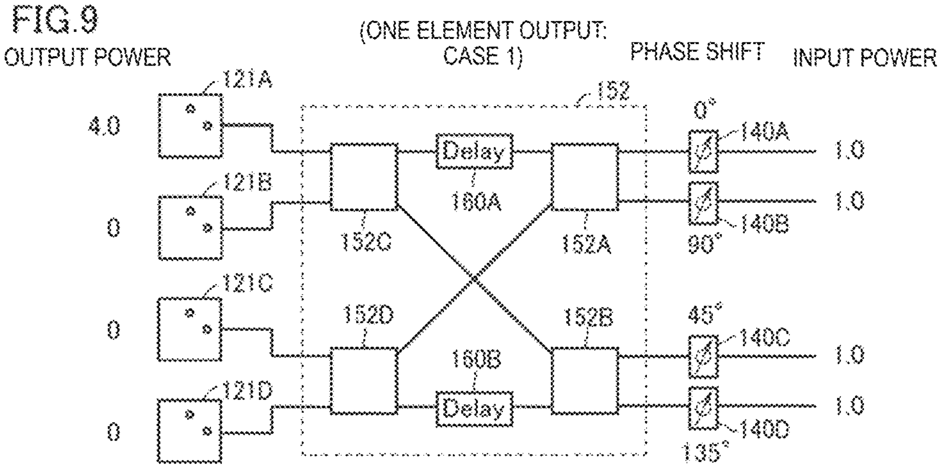
FIG. 9 is a first diagram showing an example of settings for emitting a radio wave from one element by using a Butler matrix circuit.

FIG. 9 shows an example of settings for emitting a radio wave from the radiating element 121A. In this case, power input to each input terminal of the Butler matrix circuit 152 is set to 1.0. Also, the phases of the phase shifters 140A to 140D are set to 0°, 90°, 45°, and 135°, respectively.

By setting the power and phases of the input radio frequency signals as described above, it is possible to emit a radio wave with fourfold power from the radiating element 121A.

(a-2: Output from Radiating Element 121B)

Figure 10:
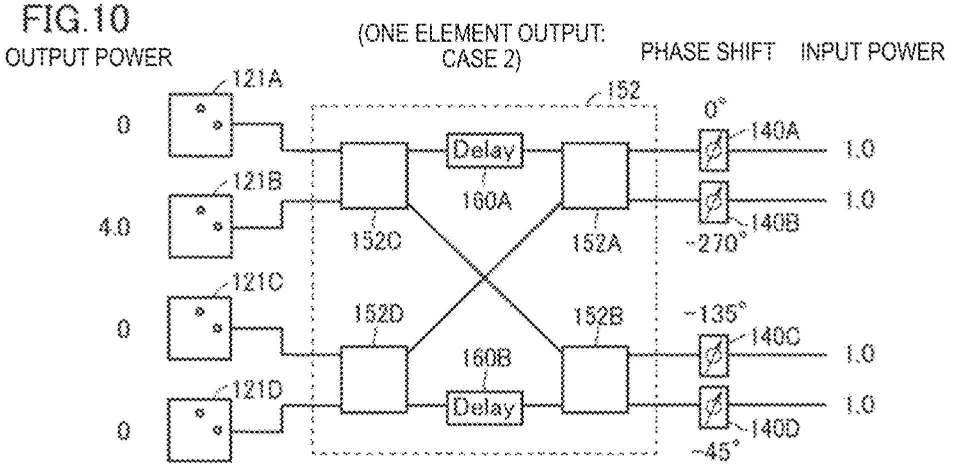
FIG. 10 is a second diagram showing an example of settings for emitting a radio wave from one element by using the Butler matrix circuit.

FIG. 10 shows an example of settings for emitting a radio wave from the radiating element 121B. In this case, power input to each input terminal of the Butler matrix circuit 152 is set to 1.0. Also, the phases of the phase shifters 140A to 140D are set to 0°, −270°, −135°, and −45°, respectively.

By setting the power and phases of the input radio frequency signals as described above, it is possible to emit a radio wave with fourfold power from the radiating element 121B.

(a-3: Output from Radiating Element 121C)

Figure 11:
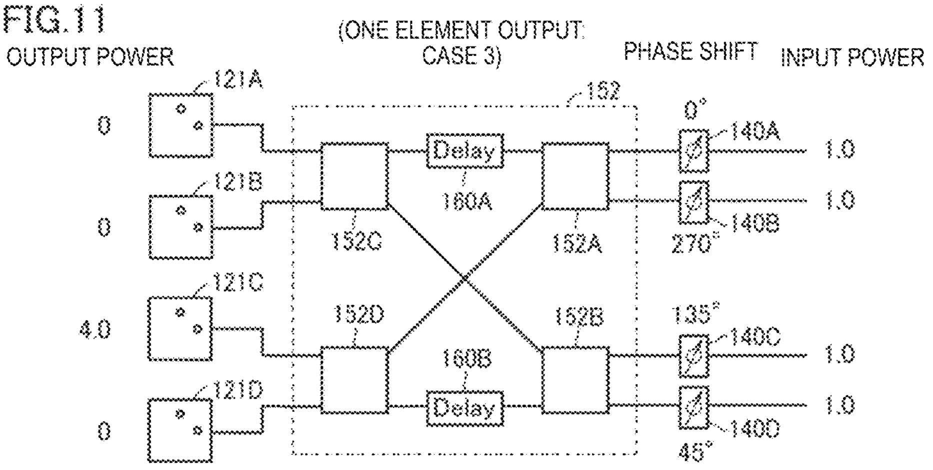
FIG. 11 is a third diagram showing an example of settings for emitting a radio wave from one element by using the Butler matrix circuit.

FIG. 11 shows an example of settings for emitting a radio wave from the radiating element 121C. In this case, power input to each input terminal of the Butler matrix circuit 152 is set to 1.0. Also, the phases of the phase shifters 140A to 140D are set to 0°, 270°, 135°, and 45°, respectively.

By setting the power and phases of the input radio frequency signals as described above, it is possible to emit a radio wave with fourfold power from the radiating element 121C.

(a-4: Output from Radiating Element 121D)

Figure 12:
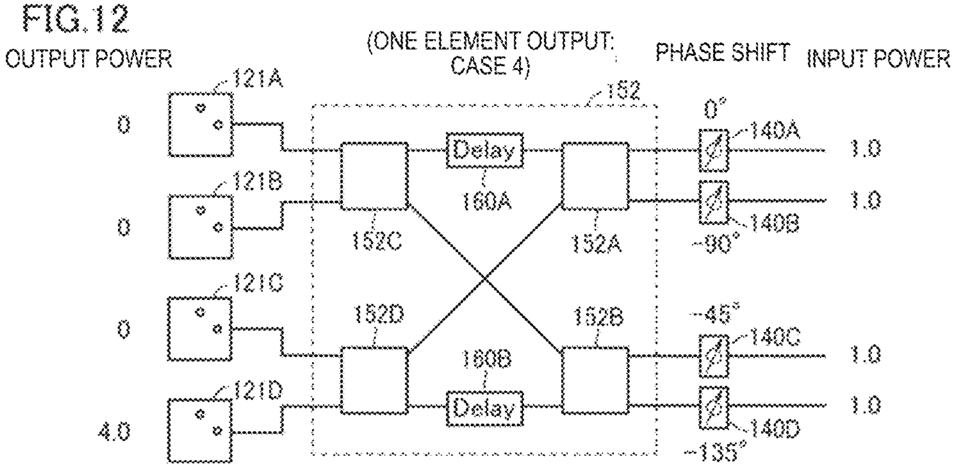
FIG. 12 is a fourth diagram showing an example of settings for emitting a radio wave from one element by using the Butler matrix circuit.

FIG. 12 shows an example of settings for emitting a radio wave from the radiating element 121D. In this case, power input to each input terminal of the Butler matrix circuit 152 is set to 1.0. Also, the phases of the phase shifters 140A to 140D are set to 0°, −90°, −45°, and −135°, respectively.

By setting the power and phases of the input radio frequency signals as described above, it is possible to emit a radio wave with fourfold power from the radiating element 121D.

(b: Two Element Output)

Next, settings for emitting radio waves from two of the four radiating elements 121A to 121D are described with reference to FIGS. 13 to 18.

(b-1: Output from Radiating Elements 121A and 121B)

Figure 13:
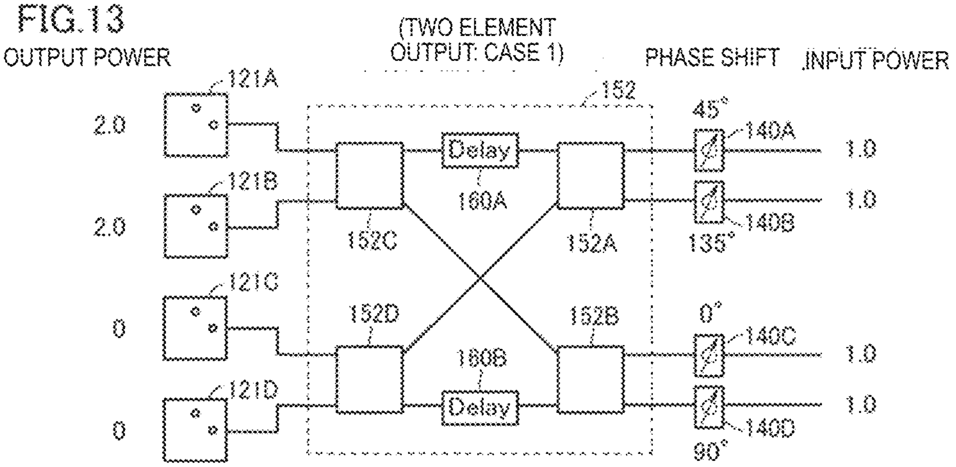
FIG. 13 is a first diagram showing an example of settings for emitting radio waves from two elements by using the Butler matrix circuit.

FIG. 13 shows an example of settings for emitting radio waves from the radiating elements 121A and 121B. In this case, power input to each input terminal of the Butler matrix circuit 152 is set to 1.0. Also, the phases of the phase shifters 140A to 140D are set to 45°, 135°, 0°, and 90°, respectively.

By setting the power and phases of the input radio frequency signals as described above, it is possible to emit a radio wave with twofold power from each of the radiating elements 121A and 121B.

(b-2: Output from Radiating Elements 121A and 121C)

Figure 14:
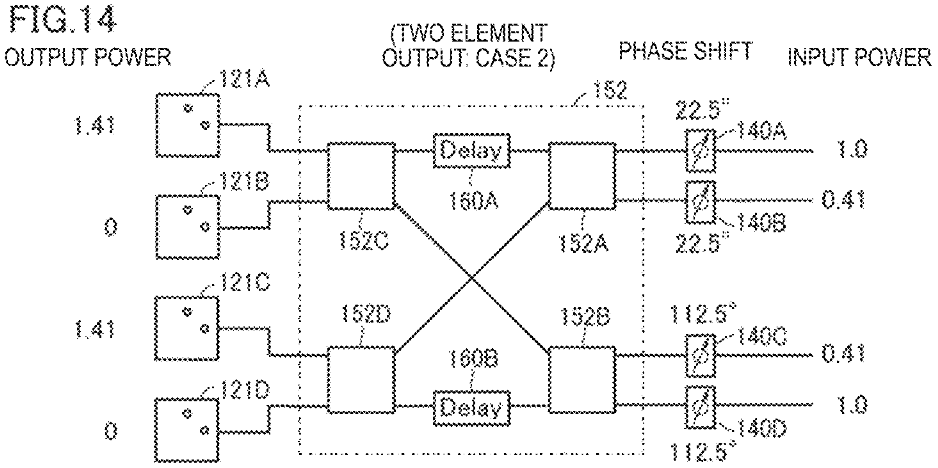
FIG. 14 is a second diagram showing an example of settings for emitting radio waves from two elements by using the Butler matrix circuit.

FIG. 14 shows an example of settings for emitting radio waves from the radiating elements 121A and 121C. In this case, power input to each of the first input terminal of the hybrid coupler 152A and the second input terminal of the hybrid coupler 152B in the Butler matrix circuit 152 is set to 1.0. On the other hand, power input to each of the second input terminal of the hybrid coupler 152A and the first input terminal of the hybrid coupler 152B is set to 0.41. Also, the phases of the phase shifters 140A to 140D are set to 22.5°, 22.5°, 112.5°, and 112.5°, respectively.

By setting the power and phases of the input radio frequency signals as described above, it is possible to emit a radio wave with 1.41-fold power from each of the radiating elements 121A and 121C.

(b-3: Output from Radiating Elements 121A and 121D)

Figure 15:
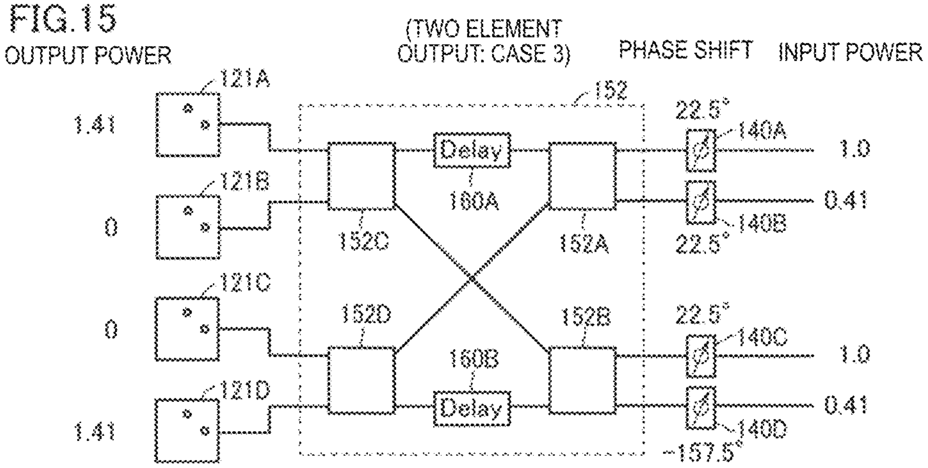
FIG. 15 is a third diagram showing an example of settings for emitting radio waves from two elements by using the Butler matrix circuit.

FIG. 15 shows an example of settings for emitting radio waves from the radiating elements 121A and 121D. In this case, power input to each of the first input terminals of the hybrid coupler 152A and the hybrid coupler 152B in the Butler matrix circuit 152 is set to 1.0. On the other hand, power input to each of the second input terminals of the hybrid coupler 152A and the hybrid coupler 152B is set to 0.41. Also, the phases of the phase shifters 140A to 140D are set to 22.5°, 22.5°, 22.5°, and −157.5°, respectively.

By setting the power and phases of the input radio frequency signals as described above, it is possible to emit a radio wave with 1.41-fold power from each of the radiating elements 121A and 121D.

(b-4: Output from Radiating Elements 121B and 121C)

Figure 16:
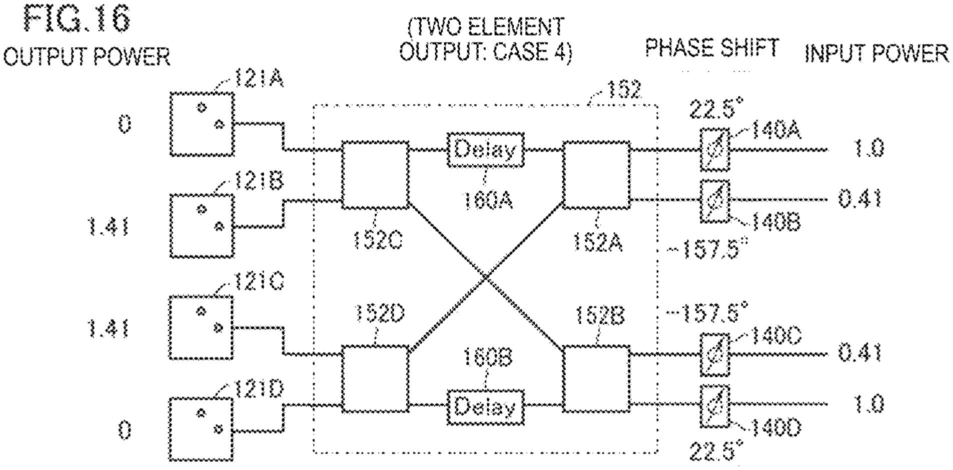
FIG. 16 is a fourth diagram showing an example of settings for emitting radio waves from two elements by using the Butler matrix circuit.

FIG. 16 shows an example of settings for emitting radio waves from the radiating elements 121B and 121C. In this case, power input to each of the first input terminal of the hybrid coupler 152A and the second input terminal of the hybrid coupler 152B in the Butler matrix circuit 152 is set to 1.0. On the other hand, power input to each of the second input terminal of the hybrid coupler 152A and the first input terminal of the hybrid coupler 152B is set to 0.41. Also, the phases of the phase shifters 140A to 140D are set to 22.5°, −157.5°, −157.5°, and 22.5°, respectively.

By setting the power and phases of the input radio frequency signals as described above, it is possible to emit a radio wave with 1.41-fold power from each of the radiating elements 121B and 121C.

(b-5: Output from Radiating Elements 121B and 121D)

Figure 17:
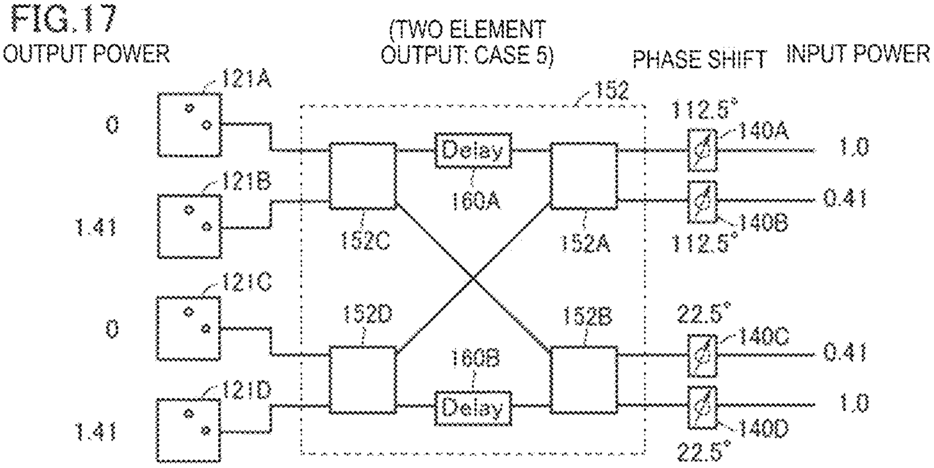
FIG. 17 is a fifth diagram showing an example of settings for emitting radio waves from two elements by using the Butler matrix circuit.

FIG. 17 shows an example of settings for emitting radio waves from the radiating elements 121B and 121D. In this case, power input to each of the first input terminal of the hybrid coupler 152A and the second input terminal of the hybrid coupler 152B in the Butler matrix circuit 152 is set to 1.0. On the other hand, power input to each of the second input terminal of the hybrid coupler 152A and the first input terminal of the hybrid coupler 152B is set to 0.41. Also, the phases of the phase shifters 140A to 140D are set to 112.5°, 112.5°, 22.5°, and 22.5°, respectively.

By setting the power and phases of the input radio frequency signals as described above, it is possible to emit a radio wave with 1.41-fold power from each of the radiating elements 121B and 121D.

(b-6: Output from Radiating Elements 121C and 121D)

Figure 18:
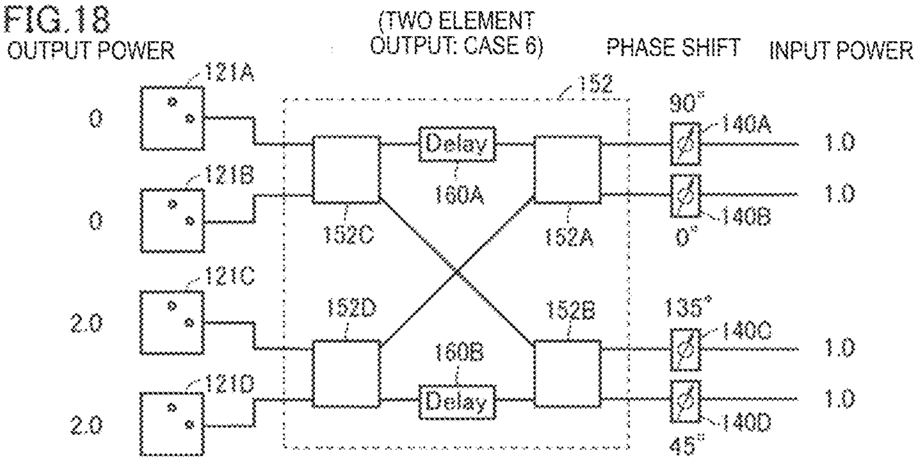
FIG. 18 is a sixth diagram showing an example of settings for emitting radio waves from two elements by using the Butler matrix circuit.

FIG. 18 shows an example of settings for emitting radio waves from the radiating elements 121C and 121D. In this case, power input to each input terminal of the Butler matrix circuit 152 is set to 1.0. Also, the phases of the phase shifters 140A to 140D are set to 90°, 0°, 135°, and 45°, respectively.

By setting the power and phases of the input radio frequency signals as described above, it is possible to emit a radio wave with twofold power from each of the radiating elements 121C and 121D.

(c: Three Element Output)

Next, settings for emitting radio waves from three of the radiating elements 121A to 121D are described with reference to FIGS. 19 to 22.

(c-1: Output from Radiating Elements 121A, 121B, and 121C)

Figure 19:
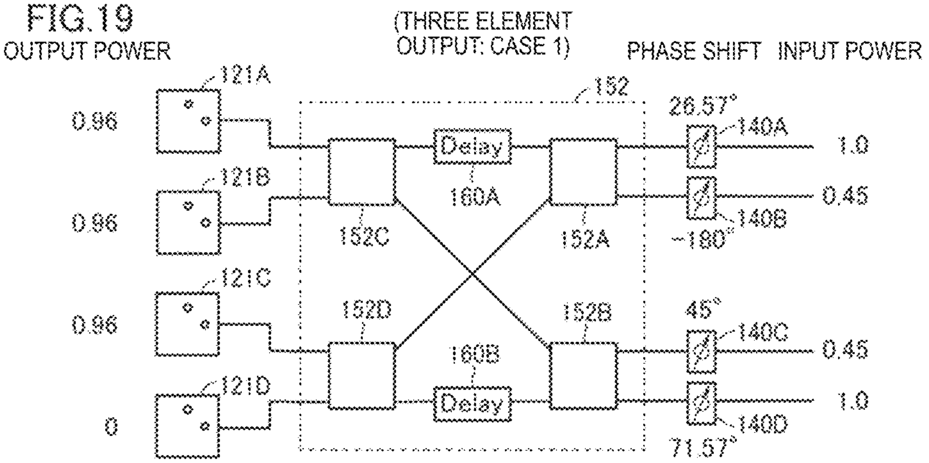
FIG. 19 is a first diagram showing an example of settings for emitting radio waves from three elements by using the Butler matrix circuit.

FIG. 19 shows an example of settings for emitting radio waves from radiating elements 121A, 121B, and 121C. In this case, power input to each of the first input terminal of the hybrid coupler 152A and the second input terminal of the hybrid coupler 152B in the Butler matrix circuit 152 is set to 1.0. On the other hand, power input to each of the second input terminal of the hybrid coupler 152A and the first input terminal of the hybrid coupler 152B is set to 0.45. Also, the phases of the phase shifters 140A to 140D are set to 26.57°, −180°, 45°, and 71.57°, respectively.

By setting the power and phases of the input radio frequency signals as described above, it is possible to emit a radio wave with 0.96-fold power from each of the radiating elements 121A, 121B, and 121C.

(c-2: Output from Radiating Elements 121A, 121C, and 121D)

Figure 20:
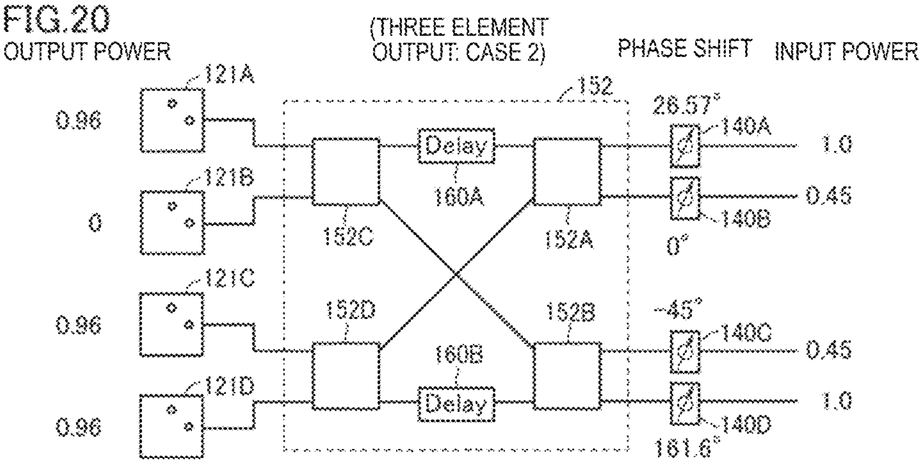
FIG. 20 is a second diagram showing an example of settings for emitting radio waves from three elements by using the Butler matrix circuit.

FIG. 20 shows an example of settings for emitting radio waves from radiating elements 121A, 121C, and 121D. In this case, power input to each of the first input terminal of the hybrid coupler 152A and the second input terminal of the hybrid coupler 152B in the Butler matrix circuit 152 is set to 1.0. On the other hand, power input to each of the second input terminal of the hybrid coupler 152A and the first input terminal of the hybrid coupler 152B is set to 0.45. Also, the phases of the phase shifters 140A to 140D are set to 26.57°, 0°, −45°, and 161.6°, respectively.

By setting the power and phases of the input radio frequency signals as described above, it is possible to emit a radio wave with 0.96-fold power from each of the radiating elements 121A, 121C, and 121D.

(c-3: Output from Radiating Elements 121B, 121C, and 121D)

Figure 21:
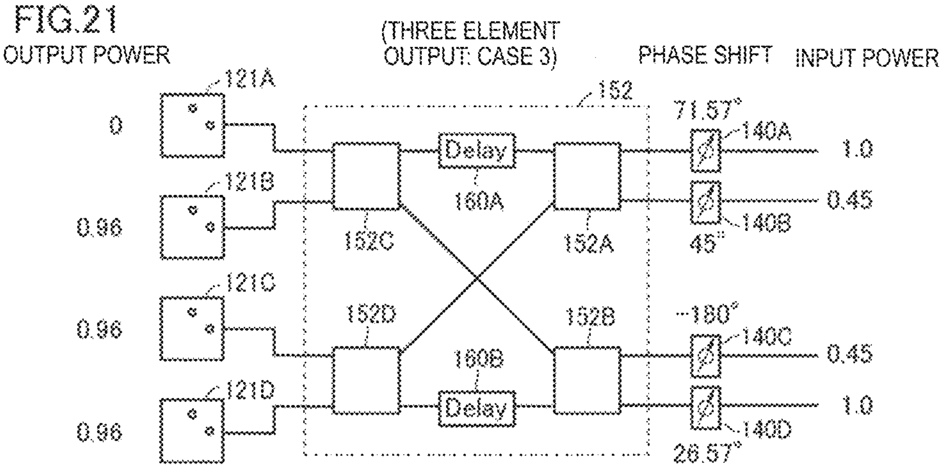
FIG. 21 is a third diagram showing an example of settings for emitting radio waves from three elements by using the Butler matrix circuit.

FIG. 21 shows an example of settings for emitting radio waves from the radiating elements 121B, 121C, and 121D. In this case, power input to each of the first input terminal of the hybrid coupler 152A and the second input terminal of the hybrid coupler 152B in the Butler matrix circuit 152 is set to 1.0. On the other hand, power input to each of the second input terminal of the hybrid coupler 152A and the first input terminal of the hybrid coupler 152B is set to 0.45. Also, the phases of the phase shifters 140A to 140D are set to 71.57°, 45°, −180°, and 26.57°, respectively.

By setting the power and phases of the input radio frequency signals as described above, it is possible to emit a radio wave with 0.96-fold power from each of the radiating elements 121B, 121C, and 121D.

(c-4: Output from Radiating Elements 121A, 121B, and 121D)

Figure 22:
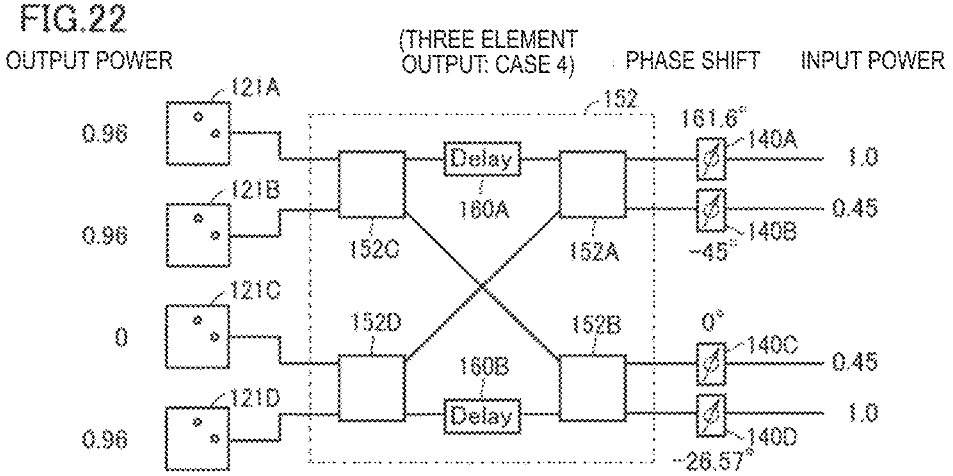
FIG. 22 is a fourth diagram showing an example of settings for emitting radio waves from three elements by using the Butler matrix circuit.

FIG. 22 shows an example of settings for emitting radio waves from radiating elements 121A, 121B, and 121D. In this case, power input to each of the first input terminal of the hybrid coupler 152A and the second input terminal of the hybrid coupler 152B in the Butler matrix circuit 152 is set to 1.0. On the other hand, power input to each of the second input terminal of the hybrid coupler 152A and the first input terminal of the hybrid coupler 152B is set to 0.45. Also, the phases of the phase shifters 140A to 140D are set to 161.6°, −45°, 0°, and −26.57°, respectively.

By setting the power and phases of the input radio frequency signals as described above, it is possible to emit a radio wave with 0.96-fold power from each of the radiating elements 121A, 121B, and 121D.

As described above, assuming the supply of power to one or more radiating elements over which one or more obstacles are present is stopped, power can be efficiently supplied to the remaining radiating elements by using a Butler matrix circuit.

Fourth Embodiment

In an antenna module with a multifaceted structure according to a fourth embodiment, radiating elements are disposed on dielectric substrates with different normal directions.

Figure 23:
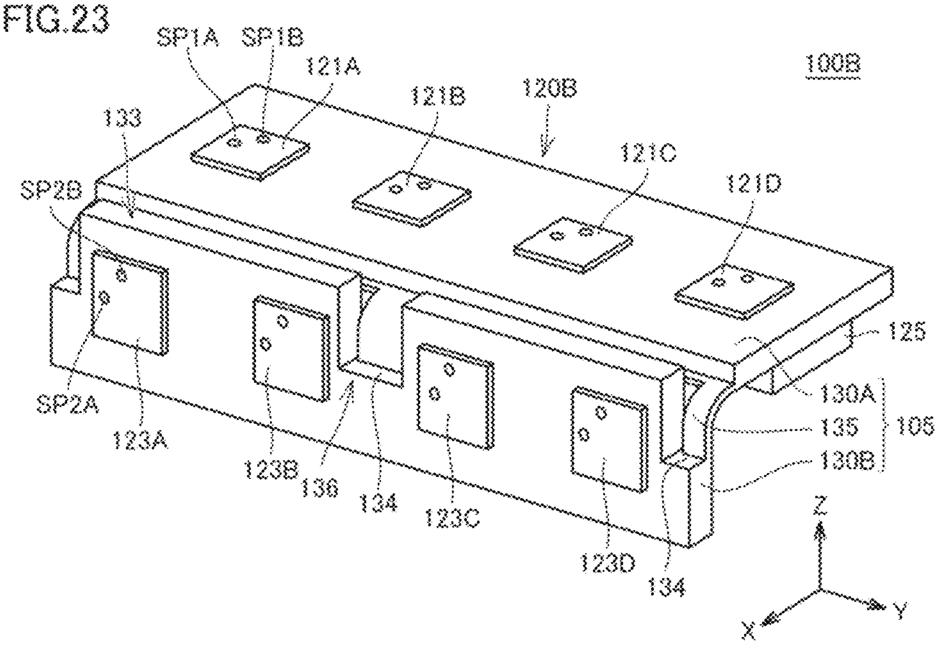
FIG. 23 is a perspective view of an antenna module according to a fourth embodiment.

FIG. 23 is a perspective view of an antenna module 100B according to the fourth embodiment. Referring to FIG. 23, the antenna module 100B includes a System in Package (SiP) module 125, which includes an RFIC and a power module IC (PMIC) that is a power control circuit, and an antenna device 120B. The antenna device 120B includes a dielectric substrate 105 and radiating elements 121A to 121D and 123A to 123D. In the descriptions below, the radiating elements 123A to 123D may be collectively referred to as "radiating elements 123".

The dielectric substrate 105 includes substrates 130A and 130B with different normal directions and bent parts 135 that connect the substrates 130A and 130B to each other. The dielectric substrate 105 has a substantially L-shaped cross section. The radiating elements 121A to 121D are arranged in a row on the substrate 130A, and the radiating elements 123A to 123D are arranged in a row on the substrate 130B. The radiating elements 121 and 123 may instead be disposed in the internal layers of the substrates 130A and 130B. In FIG. 23, the normal direction of the substrate 130A corresponds to the Z-axis direction, the normal direction of the substrate 130B corresponds to the X-axis direction, and the direction in which the radiating elements 121 and 123 are arranged corresponds to the Y-axis direction.

The substrate 130A has a substantially rectangular shape, and four radiating elements 121 are arranged in a row on the upper surface of the substrate 130A. Also, the SiP module 125 is connected to the lower surface (a surface facing the negative Z-axis direction) of the substrate 130A. The SiP module 125 is mounted on a mounting board (not shown) using solder bumps or a multipole connector.

The substrate 130B is connected to the bent parts 135 that are bent from the substrate 130A. The substrate 130B is formed by forming multiple notches 136 in a substantially rectangular dielectric substrate, and the bent parts 135 are connected to the notches 136. In other words, protrusions 133 are formed in portions of the substrate 130B where the notches 136 are not formed. Each of the protrusions 133 protrudes, from a boundary 134 at which the bent parts 135 are connected to the substrate 130B, in a direction (the positive Z-axis direction) toward the substrate 130A and along the substrate 130B. The ends of the protrusions 133 are located farther in the positive Z-axis direction from the lower surface (on which an RFIC 110B is mounted) of the substrate 130A.

Each of the radiating elements 121 and 123 includes feeding points for emitting radio waves with different polarization directions. More specifically, in each radiating element 121, the feeding point SP1A is disposed at a position that is offset from the center of the radiating element 121 in the negative Y-axis direction, and the feeding point SP1B is disposed at a position that is offset from the center of the radiating element 121 in the negative X-axis direction. Assuming a radio frequency signal is supplied to the feeding point SP1A, a radio wave with a polarization direction corresponding to the Y-axis direction is emitted in the positive Z-axis direction. Also, assuming a radio frequency signal is supplied to the feeding point SP1B, a radio wave with a polarization direction corresponding to the X-axis direction is emitted in the positive Z-axis direction.

In each radiating element 123, a feeding point SP2A is disposed at a position that is offset from the center of the radiating element 123 in the negative Y-axis direction, and a feeding point SP2B is disposed at a position that is offset from the center of the radiating element 123 in the positive Z-axis direction. Assuming a radio frequency signal is supplied to the feeding point SP2A, a radio wave with a polarization direction corresponding to the Y-axis direction is emitted in the positive X-axis direction. Also, assuming a radio frequency signal is supplied to the feeding point SP2B, a radio wave with a polarization direction corresponding to the Z-axis direction is emitted in the positive X-axis direction.

Figure 24:
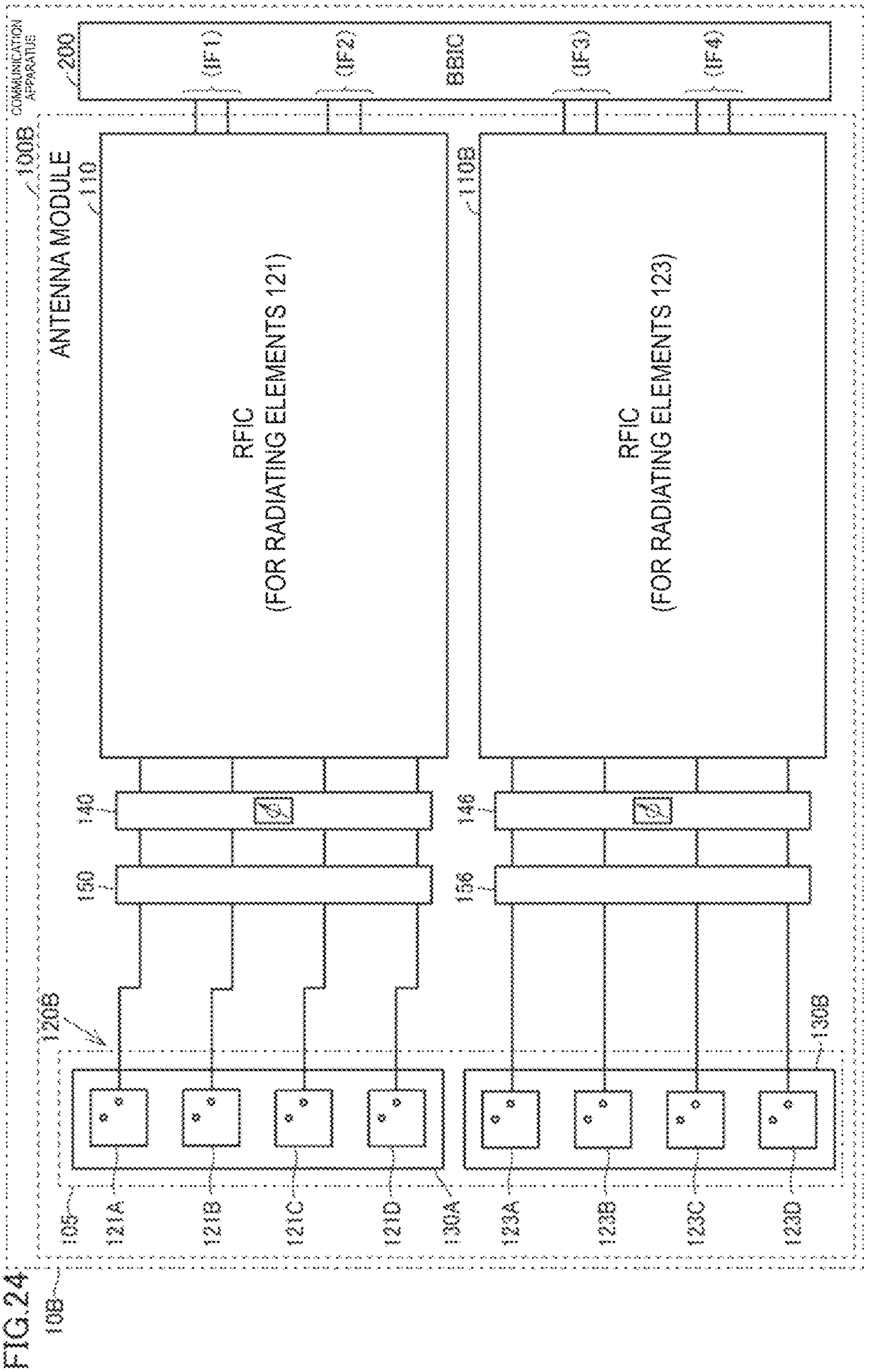
FIG. 24 is a block diagram illustrating a communication apparatus including the antenna module according to the fourth embodiment.

FIG. 24 is a block diagram of a communication apparatus 10B including the antenna module 100B according to the fourth embodiment.

The communication apparatus 10B includes the antenna module 100B and a BBIC 200. The antenna module 100B includes RFICs 110 and 110B, an antenna device 120B, phase shifters 140 and 146, and hybrid couplers 150 and 156.

The RFIC 110, the phase shifter 140, and the hybrid couplers 150 are devices for the radiating elements 121 on the substrate 130A. The RFIC 110B, the phase shifter 146, and the hybrid couplers 156 are devices for the radiating elements 123 on the substrate 130B. The configurations of the RFICs 110 and 110B, the phase shifters 140 and 146, and the hybrid couplers 150 and 156 are substantially the same as those in FIG. 7 of the third embodiment, and therefore detailed descriptions of these components are not repeated.

Also in FIG. 24, it appears that one feeding wire extending from each of the hybrid couplers 150 and 156 is connected to each radiating element. However, in an actual configuration, two feeding wires are connected to the feeding points of each radiating element.

In such an antenna module with a multifaceted structure, similarly to the first embodiment, it is possible to detect whether an obstacle is present over each of radiating elements that are disposed on different substrates and have different radiation directions. In the fourth embodiment, assuming one or more obstacles are detected over one or more radiating elements on a first substrate but no obstacle is detected over the radiating elements on a second substrate, the radiating elements on the second substrate are selected to emit radio waves. By performing an antenna switching process as described above, although the radiation direction changes, radio waves with desired power can be emitted without wasting power.

In the fourth embodiment, similarly to the first embodiment, assuming one or more obstacles are detected over one or more radiating elements on a substrate, emission of radio waves from the one or more radiating elements may be stopped, and power may be distributed to the remaining radiating elements on the same substrate to emit radio waves.

Figure 25:
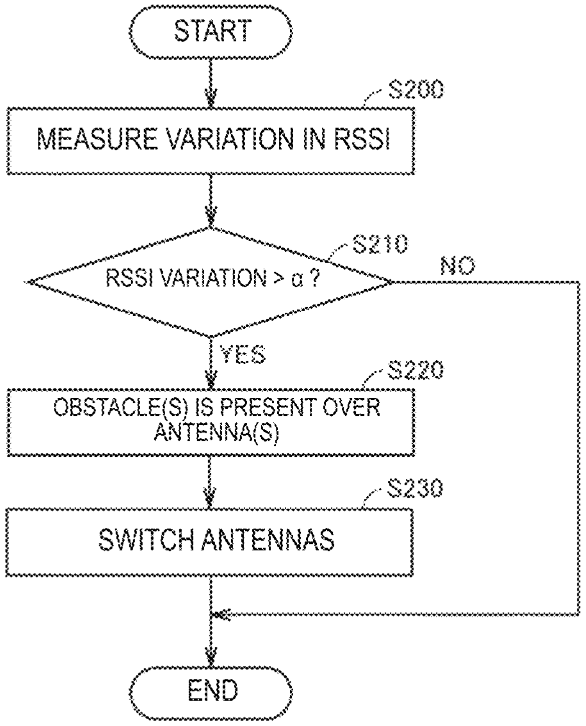
FIG. 25 is a flowchart illustrating an obstacle detection process and an antenna switching process according to the fourth embodiment.

FIG. 25 is a flowchart illustrating an obstacle detection process and an antenna switching process according to the fourth embodiment. In the fourth embodiment, it is assumed that the process of the flowchart of FIG. 25 is performed by the BBIC 200. However, the process may instead be performed by a control unit other than the BBIC 200.

Referring to FIG. 25, at S200, the BBIC 200 measures a variation in RSSI during a normal reception process. Next, at S210, the BBIC 200 determines whether the variation in RSSI is greater than a predetermined value α, i.e., whether a first condition is satisfied.

Assuming the variation in RSSI is less than or equal to the predetermined value α (NO at S210), the BBIC 200 determines that no obstacle is present over the radiating elements on a first substrate, skips the subsequent steps to end the process, and continues the normal transmission and reception processes.

Assuming the variation in RSSI is greater than the predetermined value α (YES at S210), the process proceeds to S220, and the BBIC 200 determines that one or more obstacles are present over one or more of the radiating elements on the first substrate that are receiving radio waves. Then, the BBIC 200 stops emission of radio waves from the first substrate currently receiving radio waves and switches to a second substrate to emit radio waves.

Also, although not shown in FIG. 25, assuming one or more obstacles are also detected over one or more radiating elements on the second substrate, another antenna module disposed in a different position may be selected to emit radio waves. Alternatively, emission of radio waves from the one or more radiating elements covered by one or more obstacles may be stopped, and radio waves may be emitted using the remaining radiating elements.

By performing control according to the above-described process in an antenna module with a multifaceted structure, it is possible to reduce unnecessary power consumption resulting from obstacles and prevent a decrease in radiation efficiency.

“Substrate 130A” and “substrate 130B” in the fourth embodiment correspond, respectively, to “first substrate”

and "second substrate" in the present disclosure. "Radiating elements 123" in the fourth embodiment correspond to "third radiating elements" in the present disclosure.

[Aspects]

(Paragraph 1) An antenna module according to an aspect includes first radiating elements including a first element and a second element and a radio frequency circuit, and exchanges signals with a baseband circuit. The radio frequency circuit includes a transmission circuit that supplies radio frequency signals to the first radiating elements and a reception circuit that receives radio frequency signals from the first radiating elements. The radio frequency circuit exchanges intermediate frequency signals with the baseband circuit. A first intermediate signal is used for communication between the transmission circuit and the baseband circuit. A second intermediate signal different from the first intermediate signal is used for communication between the reception circuit and the baseband circuit. Assuming a first condition is satisfied, the radio frequency circuit stops emission of radio waves from the first element, the first condition being satisfied assuming a variation in the reception level of a radio frequency signal received by the reception circuit during transmission of a radio frequency signal from the transmission circuit exceeds a predetermined value.

(Paragraph 2) In the antenna module described in paragraph 1, assuming the first condition is satisfied, the radio frequency circuit distributes, to the second element, at least a part of power corresponding to a radio frequency signal supposed to be transmitted to the first element.

(Paragraph 3) In the antenna module described in paragraph 1 or 2, the first element and the second element of the first radiating elements have a planar shape. The first element includes a first feeding point used to emit a radio wave with a first polarization direction and a second feeding point used to emit a radio wave with a second polarization direction. Assuming the first condition is satisfied in a state in which the transmission circuit is connected to the first feeding point of the first element and the reception circuit is connected to the second feeding point of the first element, emission of the radio waves from the first element is stopped.

(Paragraph 4) The antenna module described in paragraph 1 or 2 further includes a first hybrid coupler and a second hybrid coupler, each of which includes a first input terminal, a second input terminal, a first output terminal, and a second output terminal. The first element and the second element of the first radiating elements have a planar shape. Each of the first element and the second element includes a first feeding point used to emit a radio wave with a first polarization direction and a second feeding point used to emit a radio wave with a second polarization direction. The first input terminal and the second input terminal of the first hybrid coupler are connected to the transmission circuit. The first output terminal of the first hybrid coupler is connected to the first feeding point of the first element. The second output terminal of the first hybrid coupler is connected to the first feeding point of the second element. The first input terminal and the second input terminal of the second hybrid coupler are connected to the reception circuit. The first output terminal of the second hybrid coupler is connected to the second feeding point of the first element. The second output terminal of the second hybrid coupler is connected to the second feeding point of the second element.

(Paragraph 5) In the antenna module described in any one of paragraphs 1 to 4, the first element and the second element of the first radiating elements have a planar shape. The antenna module further includes second radiating elements that are paired with the first radiating elements and include multiple elements with a planar shape. The second radiating elements include a third element paired with the first element and are configured to emit radio waves in a frequency band lower than a frequency band of radio waves emitted from the first radiating elements. The first element is disposed apart from the third element in a radio wave emission direction.

(Paragraph 6) In the antenna module described in any one of paragraphs 1 to 5, whether the first condition is satisfied is sequentially determined for the respective elements included in the first radiating elements.

(Paragraph 7) In the antenna module described in paragraph 1, assuming the variation in the reception level of the radio frequency signal received by the reception circuit is greater than the predetermined value in a state in which the transmission circuit is connected to the second element and the reception circuit is connected to the first element, an obstacle over the first element and the second element is detected.

(Paragraph 8) The antenna module described in paragraph 1 further includes a Butler matrix circuit including a third hybrid coupler, a fourth hybrid coupler, a fifth hybrid coupler, a sixth hybrid coupler, a first delay circuit, and a second delay circuit. The first element and the second element of the first radiating elements have a planar shape. The first radiating elements further include a third element and a fourth element that have a planar shape. Each of the third hybrid coupler, the fourth hybrid coupler, the fifth hybrid coupler, and the sixth hybrid coupler includes a first input terminal, a second input terminal, a first output terminal, and a second output terminal. The first input terminal and the second input terminal of each of the third hybrid coupler and the fourth hybrid coupler are connected to the corresponding ports of the transmission circuit. The first output terminal of the third hybrid coupler is connected to the first input terminal of the fifth hybrid coupler via the first delay circuit. The second output terminal of the third hybrid coupler is connected to the first input terminal of the sixth hybrid coupler. The first output terminal of the fourth hybrid coupler is connected to the second input terminal of the fifth hybrid coupler. The second output terminal of the fourth hybrid coupler is connected to the second input terminal of the sixth hybrid coupler via the second delay circuit. The first output terminal and the second output terminal of the fifth hybrid coupler are connected, respectively, to the first element and the second element. The first output terminal and the second output terminal of the sixth hybrid coupler are connected, respectively, to the third element and the fourth element.

(Paragraph 9) In the antenna module described in paragraph 8, power supplied to the first element, the second element, the third element, and the fourth element is adjusted by adjusting the power and phases of radio frequency signals supplied to the input terminals of the third hybrid coupler and the fourth hybrid coupler.

(Paragraph 10) The antenna module described in paragraph 1 further includes a first substrate and a second substrate that have different normal directions, and third radiating elements corresponding to the first radiating elements and including multiple elements with a planar shape. The first element and the second element of the first radiating elements have a planar shape. The first radiating elements are disposed on or in the first substrate. The third radiating elements are disposed on or in the second substrate. Assuming the first condition is satisfied, the radio frequency circuit emits radio waves from the third radiating elements.

(Paragraph 11) A communication apparatus including the antenna module described in any one of paragraphs 1 to 10 and the baseband circuit.

The above-disclosed embodiments should be considered as examples and not restrictive in all respects. The scope of the present disclosure is defined by the scope of the claims rather than by the above descriptions of the embodiments and is intended to include all modifications within the scope of the claims and the meaning and scope of equivalents.

REFERENCE SIGNS LIST

10, 10A, 10B communication apparatus; 11A to 11D position; 15 housing; 30 case; 40 display screen; 100, 100A, 100B antenna module; 105, 130 dielectric substrate; 110, 110A, 110B RFIC; 111A to 111H, 113A to 113H, 117A, 117B switch; 112AR to 112HR low noise amplifier; 112AT to 112HT power amplifier; 114A to 114H attenuator; 115A to 115H, 140, 140A to 140D, 145, 146 phase shifter; 116A, 116B signal combiner/splitter; 118A, 118B mixer; 119A, 119B amplifier circuit; 120, 120A, 120B antenna device; 121, 121A to 121D, 122, 122A to 122D, 123, 123A to 123D radiating element; 125 SiP module; 130A, 130B substrate; 133 protrusion; 134 boundary; 135 bent part; 136 notch; 150, 150A to 150D, 152A to 152D, 155, 156 hybrid coupler; 152 Butler matrix circuit; 160A, 160B delay circuit; 171, 172 feeding wire; 1501, 1502 line; 200 BBIC; IF1 to IF4 intermediate frequency signal; IN1, IN2 input terminal; OUT1, OUT2 output terminal; P1 to P8 output port; RF1, RF2 radio frequency signal; SP1A, SP1B, SP2B, SP2A feeding point

The invention claimed is:

1. An antenna module that exchanges signals with a baseband integrated circuit, the antenna module comprising:

first radiating elements including a first element and a second element; and a radio frequency integrated circuit that exchanges intermediate frequency signals with the baseband integrated circuit, the radio frequency integrated circuit including a transmission circuit that supplies radio frequency signals to the first radiating elements and a reception circuit that receives radio frequency signals from the first radiating elements, wherein a first intermediate signal is used for communication between the transmission circuit and the baseband integrated circuit;

a second intermediate signal different from the first intermediate signal is used for communication between the reception circuit and the baseband integrated circuit; and when a first condition is satisfied, the radio frequency integrated circuit stops emission of radio waves from the first element, the first condition being satisfied when a variation in a reception level of a radio frequency signal received by the reception circuit via the first element or the second element during transmission of a radio frequency signal from the transmission circuit exceeds a predetermined value, and wherein the radio-frequency signal received by the reception circuit is a received signal based on the radio-frequency signal being transmitted from the transmission circuit.

2. The antenna module according to claim 1, wherein when the first condition is satisfied, the radio frequency integrated circuit distributes, to the second element, at least a part of power corresponding to a radio frequency signal supposed to be transmitted to the first element.

3. The antenna module according to claim 2, wherein the first element and the second element of the first radiating elements have a planar shape;

the first element includes a first feeding point used to emit a radio wave with a first polarization direction and a second feeding point used to emit a radio wave with a second polarization direction; and when the first condition is satisfied in a state in which the transmission circuit is connected to the first feeding point of the first element and the reception circuit is connected to the second feeding point of the first element, emission of the radio waves from the first element is stopped.

4. The antenna module according to claim 3, wherein the first element and the second element of the first radiating elements have a planar shape;

the antenna module further comprises second radiating elements that are paired with the first radiating elements and include multiple elements with a planar shape;

the second radiating elements include a third element paired with the first element and are configured to emit radio waves in a frequency band lower than a frequency band of radio waves emitted from the first radiating elements; and the first element is disposed apart from the third element in a radio wave emission direction.

5. The antenna module according to claim 3, wherein whether the first condition is satisfied is sequentially determined for the respective elements included in the first radiating elements.

6. The antenna module according to claim 2, further comprising:

a first hybrid coupler and a second hybrid coupler, each of which includes a first input terminal, a second input terminal, a first output terminal, and a second output terminal, wherein the first element and the second element of the first radiating elements have a planar shape;

each of the first element and the second element includes a first feeding point used to emit a radio wave with a first polarization direction and a second feeding point used to emit a radio wave with a second polarization direction;

the first input terminal and the second input terminal of the first hybrid coupler are connected to the transmission circuit;

the first output terminal of the first hybrid coupler is connected to the first feeding point of the first element;

the second output terminal of the first hybrid coupler is connected to the first feeding point of the second element;

the first input terminal and the second input terminal of the second hybrid coupler are connected to the reception circuit;

the first output terminal of the second hybrid coupler is connected to the second feeding point of the first element; and the second output terminal of the second hybrid coupler is connected to the second feeding point of the second element.

7. The antenna module according to claim 6, wherein the first element and the second element of the first radiating elements have a planar shape;

the antenna module further comprises second radiating elements that are paired with the first radiating elements and include multiple elements with a planar shape;

the second radiating elements include a third element paired with the first element and are configured to emit radio waves in a frequency band lower than a frequency band of radio waves emitted from the first radiating elements; and the first element is disposed apart from the third element in a radio wave emission direction.

8. The antenna module according to claim 7, wherein whether the first condition is satisfied is sequentially determined for the respective elements included in the first radiating elements.

9. The antenna module according to claim 2, wherein the first element and the second element of the first radiating elements have a planar shape;

the antenna module further comprises second radiating elements that are paired with the first radiating elements and include multiple elements with a planar shape;

the second radiating elements include a third element paired with the first element and are configured to emit radio waves in a frequency band lower than a frequency band of radio waves emitted from the first radiating elements; and the first element is disposed apart from the third element in a radio wave emission direction.

10. The antenna module according to claim 2, wherein whether the first condition is satisfied is sequentially determined for the respective elements included in the first radiating elements.

11. The antenna module according to claim 1, wherein when the variation in the reception level of the radio frequency signal received by the reception circuit is greater than the predetermined value in a state in which the transmission circuit is connected to the second element and the reception circuit is connected to the first element, an obstacle over the first element and the second element is detected.

12. The antenna module according to claim 1, wherein the first element and the second element of the first radiating elements have a planar shape;

the first radiating elements further include a third element and a fourth element that have a planar shape;

the antenna module further comprises a Butler matrix circuit including a third hybrid coupler, a fourth hybrid coupler, a fifth hybrid coupler, a sixth hybrid coupler, a first delay circuit, and a second delay circuit;

each of the third hybrid coupler, the fourth hybrid coupler, the fifth hybrid coupler, and the sixth hybrid coupler includes a first input terminal, a second input terminal, a first output terminal, and a second output terminal;

the first input terminal and the second input terminal of each of the third hybrid coupler and the fourth hybrid coupler are connected to corresponding ports of the transmission circuit;

the first output terminal of the third hybrid coupler is connected to the first input terminal of the fifth hybrid coupler via the first delay circuit;

the second output terminal of the third hybrid coupler is connected to the first input terminal of the sixth hybrid coupler;

the first output terminal of the fourth hybrid coupler is connected to the second input terminal of the fifth hybrid coupler;

the second output terminal of the fourth hybrid coupler is connected to the second input terminal of the sixth hybrid coupler via the second delay circuit;

the first output terminal and the second output terminal of the fifth hybrid coupler are connected, respectively, to the first element and the second element; and the first output terminal and the second output terminal of the sixth hybrid coupler are connected, respectively, to the third element and the fourth element.

13. The antenna module according to claim 12, wherein power supplied to the first element, the second element, the third element, and the fourth element is adjusted by adjusting power and phases of radio frequency signals supplied to the input terminals of the third hybrid coupler and the fourth hybrid coupler.

14. The antenna module according to claim 1, further comprising:

a first substrate and a second substrate that have different normal directions; and third radiating elements corresponding to the first radiating elements and including multiple elements with a planar shape, wherein the first element and the second element of the first radiating elements have a planar shape;

the first radiating elements are disposed on or in the first substrate;

the third radiating elements are disposed on or in the second substrate; and when the first condition is satisfied, the radio frequency integrated circuit emits radio waves from the third radiating elements.

15. A communication apparatus comprising:

the antenna module according to claim 14; and the baseband integrated circuit.

16. A communication apparatus comprising:

the antenna module according to claim 1; and the baseband integrated circuit.

17. The antenna module according to claim 1, wherein the first element and the second element of the first radiating elements have a planar shape;

the first element includes a first feeding point used to emit a radio wave with a first polarization direction and a second feeding point used to emit a radio wave with a second polarization direction; and when the first condition is satisfied in a state in which the transmission circuit is connected to the first feeding point of the first element and the reception circuit is connected to the second feeding point of the first element, emission of the radio waves from the first element is stopped.

18. The antenna module according to claim 1, further comprising:

a first hybrid coupler and a second hybrid coupler, each of which includes a first input terminal, a second input terminal, a first output terminal, and a second output terminal, wherein the first element and the second element of the first radiating elements have a planar shape;

each of the first element and the second element includes a first feeding point used to emit a radio wave with a first polarization direction and a second feeding point used to emit a radio wave with a second polarization direction;

the first input terminal and the second input terminal of the first hybrid coupler are connected to the transmission circuit;

the first output terminal of the first hybrid coupler is connected to the first feeding point of the first element;

the second output terminal of the first hybrid coupler is connected to the first feeding point of the second element;

the first input terminal and the second input terminal of the second hybrid coupler are connected to the reception circuit;

the first output terminal of the second hybrid coupler is connected to the second feeding point of the first element; and the second output terminal of the second hybrid coupler is connected to the second feeding point of the second element.

19. The antenna module according to claim 1, wherein the first element and the second element of the first radiating elements have a planar shape;

the antenna module further comprises second radiating elements that are paired with the first radiating elements and include multiple elements with a planar shape;

the second radiating elements include a third element paired with the first element and are configured to emit radio waves in a frequency band lower than a frequency band of radio waves emitted from the first radiating elements; and the first element is disposed apart from the third element in a radio wave emission direction.

20. The antenna module according to claim 1, wherein whether the first condition is satisfied is sequentially determined for the respective elements included in the first radiating elements.

* * * * *